United States Patent
Tado

(10) Patent No.: US 6,852,163 B2
(45) Date of Patent: Feb. 8, 2005

(54) EXTRA HIGH VOLTAGE GENERATOR

(75) Inventor: Masashi Tado, Iyomishima (JP)

(73) Assignee: Sumitomo Heavy Industries, Tokyo (JP)

( * ) Notice: Subject to any disclaimer, the term of this patent is extended or adjusted under 35 U.S.C. 154(b) by 211 days.

(21) Appl. No.: 10/129,121

(22) PCT Filed: Dec. 14, 2001

(86) PCT No.: PCT/JP01/11010
§ 371 (c)(1),
(2), (4) Date: Jul. 3, 2002

(87) PCT Pub. No.: WO02/051623
PCT Pub. Date: Jul. 4, 2002

(65) Prior Publication Data
US 2003/0057786 A1 Mar. 27, 2003

(30) Foreign Application Priority Data

Dec. 22, 2000 (JP) .......................................... 2000-390792
Jul. 23, 2001 (JP) .......................................... 2001-220754
Nov. 16, 2001 (JP) .......................................... 2001-351907

(51) Int. Cl.$^7$ ............................................. C30B 29/00
(52) U.S. Cl. ...................... 117/205; 117/79; 117/224; 117/929; 423/446.1
(58) Field of Search ...................... 423/441.1; 117/929, 117/79, 205, 224

(56) References Cited
U.S. PATENT DOCUMENTS

| | | | | |
|---|---|---|---|---|
| 2,941,246 A | * | 6/1960 | Bundy ........................ | 425/77 |
| 3,031,269 A | * | 4/1962 | Bovenkerk .................. | 423/446 |
| 3,142,595 A | * | 7/1964 | Wentorf, Jr. ................ | 148/33 |
| 3,407,445 A | * | 10/1968 | Strong ........................ | 425/77 |
| 3,546,413 A | * | 12/1970 | Ishizuka ..................... | 219/50 |
| 4,333,986 A | * | 6/1982 | Tsuji et al. ................. | 428/402 |
| 4,430,051 A | * | 2/1984 | von Platen ................. | 425/77 |
| 5,360,477 A | * | 11/1994 | Inoue et al. ................ | 117/4 |

* cited by examiner

Primary Examiner—Robert Kunemund
(74) Attorney, Agent, or Firm—Arent Fox

(57) ABSTRACT

A very-high pressure generator of construction such that the lower and upper guide blocks of the generator are each configured so as to form a pyramidal recess on the bottom surface and an upside-down pyramidal recess on the top surface accurately symmetrically, their pyramidal slopes given one and the same angle of inclination and are prevented from being deformed under high pressure not by enlarging the guide blocks and the press, but by making the support conditions of all the anvils of the generator uniform, the positions of the anvils can easily be adjusted and therefore the generator is capable of pressurizing a pressure transmitting medium into the shape of the desired cube accurately. Each of the lower and upper guide blocks has a pyramidal recess in its bottom surface and an upside-down pyramided recess in its top surface and us symmetric with respect to its horizontal center plane. Each of lower and upper base blocks has a lower upside-down pyramidal portion and an upper pyramidal portion. The upper base block is disposed at the center of the lower pyramidal recess of the upper guide block. An upper downward pyramidal block is disposed between the press frame and the upper upside-down pyramidal recess of the upper guide block.

10 Claims, 14 Drawing Sheets

(A)

(B)

(A)

(B)

(A)

(B)

(C)

EXTRA HIGH VOLTAGE GENERATOR

CROSS-REFERENCE TO RELATED APPLICATION

This application is a National Stage entry of International Application No. PCT/JP01/11010, filed Dec. 14, 2001, the entire specification claims and drawings of which are incorporated herewith by reference.

BACKGROUND OF THE INVENTION

The present invention relates to a very-high pressure generator. More specifically, the invention relates to a very-high pressure generator for synthesizing diamonds, elucidating phenomena under very high pressure, and so on.

A very-high pressure generator with conventional DIA-type guide blocks will first be described. As shown in FIG. 13, the very-high pressure generator comprises a lower guide block 101, an upper guide block 102 disposed downward, a lower base plate 103 set at the center on the lower guide block 101, a lower anvil 104 set on the lower base plate 103, an upper base plate 105 set downward at the center on the upper downward guide block 102, an upper anvil 106 set on the top of the upper downward base plate 105, four slide blocks 107 which are pressed inward by four slopes of an upside-down pyramidal recess formed in the top surface of the lower guide block 101 and four slopes of a pyramidal recess formed in the top surface of the upper downward guide block 102, and four side anvils 108 set laterally inward on the inner sides of the four slide blocks 107.

The slopes of the pyramidal recesses of the lower and upper guide blocks 101 and 102 and the slopes of pyramidal portions of the slide blocks 107 are designed so as to make the reduction rate of the face-to-face distances between two side anvils 108 opposite to each other and between the other two side anvils 108 opposite to each other equal to the reduction rate of the face-to-face distance between the lower and upper anvils 104 and 106 under increasing pressure of the press. The six anvils 104, 106, and 108 are generally so arranged that their front end surfaces form a cubic pressurizing space where a pressure-transmitting medium is placed. Accordingly, by placing a pressure-transmitting medium in the space formed by the six anvils 104, 106, and 108 and pressing the lower and upper guide block 101 and 102 with a press ram, the pressure-transmitting medium is pressurized.

If the above conventional DIA-type guide blocks and a cell formed by sintered diamonds are combined to do a pressurizing experiment, the following two technical challenges have to be met.

(1) Raising the Rigidity of the Guide Blocks

It is necessary to raise the rigidity of the lower and upper guide blocks 101 and 102 so as to pressurize a pressure-transmitting medium, keeping the face-to-face distances between the anvils 104, 106, and 108 uniform.

(2) Raising the Rigidity of the Press

The difference between the deformation of the lower guide block 101 and that of the upper guide block 102 has to be minimized by uniforming the supporting conditions of the lower and upper guide blocks 101 and 102 as far as possible.

The above challenges can be met by increasing the size of the guide blocks 101 and 102 and the press frame, which, however, poses the following problems.

(1) Large-sized guide blocks (i) If the dimensions (thickness) of the guide blocks 101 and 102 are increased, the deformation of the surface areas of the guide blocks 101 and 102 supporting the base plates 103 and 105 increases due to the pressure exerted by the base plates 103 and 105 supporting the anvils 104 and 106 as shown by reference sign "X" in FIG. 14. Besides, the deformation is not even in the surface areas under the base plates 103 and 105, which may affect the cell formed by diamonds. Moreover, the deformation increases as the requirement for pressure increases.

(ii) If the guide blocks 101 and 102 are made wider and deeper while their height is left unchanged, the bending moment on the guide blocks 101 and 102 due to the pressure on the slopes of the pyramidal recesses of the guide blocks 101 and 102 exerted by the slide blocks 107 does not decrease, and hence the deformation of the slopes (change of angle of inclination of the slopes) hardly decreases. In other words, as shown by reference sign "Y" in FIG. 14, large stress due to the bending moment acts on the lines where the slopes meet the flat bottom, causing large strain. The angle of inclination of the slopes decreases as the load on the guide block increases (as shown in phantom in dash-double dot lines); accordingly, the design geometrical travel of the slide blocks 107, which could be attained if no deformation occurred, can not be attained.

Therefore, the necessary precision can be secured only in experiments where guide blocks with enough rigidity (oversized guide blocks) are used under relatively small pressure up to 1,000 tons or so.

(2) Large-sized press (i) It is possible in principle to reduce the deformation of the surface areas of the lower and upper guide blocks 101 and 102 supporting the lower and upper base plates 103 and 105 by increasing the size of the press, but it poses the problem of increased weight of the press. Besides, such a press requires large bearing power of the ground and is large in height.

(ii) In addition, special consideration is required to uniform the support conditions of all the anvils 104, 106, and 108 and thereby make the macroscopic deformation of each guide block even.

Accordingly, it would be very difficult to increase the rigidity of the lower and upper guide blocks 101 and 102 by increasing the size of the press so long as the present design of DIA-type guide blocks is applied to the very-high pressure generator under various preconditions.

The very-high pressure generator currently in use has the following further problems due to the configuration and structure of the lower and upper guide blocks 101 and 102.

(3) Assuming that the lower guide block 101 is on the ram side and the upper guide block 102 is on the frame side, the pressure acts on the six anvils 104, 106, and 108 through the lower guide block 101 and the reaction acts on the six anvils 104, 106, and 108 through the upper guide block 102. The portion of the upper guide block 102 supporting the base plate 105 of the upper anvil 106 is pressed vertically upward by the pressure; accordingly compressive stress occurs in the portion. The portion of the lower guide block 101 supporting the base plate 103 of the lower anvil 104 is pressed vertically downward by the reaction; accordingly compressive stress occurs in the portion. On the other hand, each slope of the pyramidal recess of the upper guide block 102 is pressed perpendicularly thereto by the pressure transmitted through a corresponding slope of a corresponding slide block 107. Each slope of the pyramidal recess of the lower guide block 101 is pressed perpendicularly thereto by the reaction transmitted through a corresponding slope of a corresponding slide block 107. Thus, compressive stress and bending stress occur in the slope portions and their adjacent portions of the upper and lower guide block 102 and 101. In other wards, the lower and upper anvils 104 and 106 are supported more rigidly than the side anvils 108; therefore, the lower and upper anvils 104 and 106 advance more than the side anvils 108 under increasing pressure.

(4) If the machining error of one of the lower and upper guide blocks 101 and 102, the slide blocks 107, and the six anvils 104, 106, and 108 goes over the tolerance, the rates of change of the face-to-face distances of the three pairs of anvils under increasing pressure become uneven.

In accordance with the above, the object of the present invention is to provide a very-high pressure generator of construction such that the lower and upper guide blocks of the generator are each configured so as to form a pyramidal recess on the bottom surface and an upside-down pyramidal recess on the top surface accurately symmetrically, their pyramidal slopes given one and the same angle of inclination, and are prevented from being deformed under high pressure not by enlarging the guide blocks and the press, but by making the support conditions of all the anvils of the generator uniform, the positions of the anvils can easily be adjusted, and therefore the generator is capable of pressurizing a pressure-transmitting medium into the shape of a desired cube accurately.

SUMMARY OF THE INVENTION

According to the first feature of the present invention, there is provided a very-high pressure generator comprising (i) a lower pyramidal block which has a base portion and a pyramidal portion formed on the base portion, the pyramidal portion being in the shape of a right pyramid with a bottom in the figure of a regular quadrangle, (ii) a lower guide block which has a pyramidal recess in its bottom surface defined by four uniform slopes sloping up toward the center of the block, the recess being in the shape of a right pyramid with a bottom in the figure of a regular quadrangle, and an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane, (iii) a lower base block which has a lower upside-down pyramidal portion and an upper pyramidal portion, each of the pyramidal portions being in the shape of a right pyramid with a bottom in the figure of a regular quadrangle, is symmetric with respect to the horizontal center plane between the upper and lower pyramidal portions, and is provided on the top of the upper pyramidal portion with a lower anvil, (iv) four slide blocks each of which has an inner pyramidal portion laid laterally inward and an outer pyramidal portion laid laterally outward, each of the inner and outer pyramidal portions being in the shape of a right pyramid with a bottom in the figure of a regular quadrangle, is symmetric with respect to the vertical center plane between the inner and outer pyramidal portions, and is provided on the pyramidal top of the inner pyramidal portion with a side anvil, (v) an upper base block which has a lower upside-down pyramidal portion and an upper pyramidal portion, each of the pyramidal portions being in the shape of a right pyramid with a bottom in the figure of a regular quadrangle, is symmetric with respect to its horizontal center plane, and is provided on the pyramidal top of the lower upside-down pyramidal portion with an upper anvil, (vi) an upper guide block which has a pyramidal recess in its bottom surface defined by four uniform slopes sloping up toward the center of the block, the recess being in the shape of a right pyramid with a bottom in the figure of a regular quadrangle, and an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane, and (vii) an upper pyramidal block which has a base portion and a pyramidal portion formed on the base portion, the pyramidal portion being in the shape of a right pyramid with a bottom in the figure of a regular quadrangle, and is disposed downward. The above components are arranged from bottom to top in the order of their description between a ram and a frame of a press. The lower pyramidal block is set on the ram or the frame. The lower guide block is set on the lower pyramidal block, the pyramidal portion of the lower pyramidal block being fitted into the lower pyramidal recess of the lower guide block. The lower base block is disposed at the center of the upper upside-down pyramidal recess of the lower guide block. The base of the upper downward pyramidal block is secured to the frame or the ram, as the case may be. The upper guide block is secured to the upper downward pyramidal block, the pyramidal portion of the upper downward pyramidal block being fitted into the upper upside-down pyramidal recess of the upper guide block. The upper base block is disposed at the center of the lower pyramidal recess of the upper guide block. The four slide blocks are disposed so as to slide along the pyramidal slopes of the upper pyramidal portion of the lower base block, the pyramidal slopes of the lower upside-down pyramidal portion of the upper base block, the pyramidal slopes of the upper upside-down pyramidal recess of the lower guide block, and the pyramidal slopes of the lower pyramidal recess of the upper guide block.

According to the second feature of the present invention, there is provided a very-high pressure generator comprising (i) a lower pyramidal block which has a base portion and a pyramidal portion formed on the base portion, the pyramidal portion being in the shape of a right pyramid with a bottom in the figure of a regular quadrangle, (ii) a lower guide block which has (a) a vertical through hole at its center, (b) a pyramidal recess in its bottom surface defined by four uniform slopes sloping up toward the center of the block, the recess being in the shape of a right pyramid with a bottom in the figure of a regular quadrangle, and (c) an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane, (iii) a lower base block which includes an insert block to be inserted in the through hole of the lower guide block and a pyramidal press block set on the insert block, the pyramidal press block being in the shape of a right pyramid with a bottom in the figure of a regular quadrangle, and is provided on the top of the pyramidal press block with a lower anvil, (iv) four slide blocks each of which includes an inner pyramidal press block laid laterally inward and an outer pyramidal block laid laterally outward, each of the inner and outer pyramidal blocks being in the shape of a right pyramid with a bottom in the figure of a regular quadrangle, and is provided on the pyramidal top of the inner pyramidal press block with a side anvil, (v) an upper base block which includes an insert block and a pyramidal press block set on the insert block, the pyramidal press block being in the shape of a right pyramid with a bottom in the figure of a regular quadrangle, is disposed downward, and is provided on the pyramidal top of the pyramidal press block with an upper anvil, (vi) an upper guide block which has (a) a vertical through hole at its center which the insert block of the upper base block is inserted in, (b) a pyramidal recess in its bottom surface defined by four uniform slopes sloping up toward the center of the block, the recess being in the shape of a right pyramid with a bottom in the figure of a regular quadrangle, and (c) an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane, and (vii) an upper pyramidal block which has a base portion and a pyramidal portion formed on the base portion, the pyramidal portion being in the shape of a right pyramid with a bottom in the figure of a regular quadrangle, and is disposed downward. The above components are arranged from bottom to top in the order of their description between a ram and a frame of a press. The lower pyramidal block is set on the ram or the frame. The lower guide block is set on the lower pyramidal block, the pyramidal portion of the lower pyramidal block being fitted into the lower pyramidal recess of the lower guide block. The insert block of the lower base block is inserted in the vertical through hole of the lower guide block. The base of the upper downward pyramidal block is secured to the frame or the ram, as the case may be. The upper guide block is secured to the upper downward pyramidal block, the pyramidal portion of the upper downward pyramidal block being fitted into the upper upside-down pyramidal recess of the upper guide block. The insert block of the upper downward base block is inserted in the vertical through hole of the upper guide block. The four slide blocks are disposed so as to slide along the pyramidal slopes of the pyramidal press block of the lower base block, the pyramidal slopes of the pyramidal press block of the upper downward base block, the pyramidal slopes of the upper upside-down pyramidal recess of the lower guide block, and the pyramidal slopes of the lower pyramidal recess of the upper guide block.

According to the third feature of the present invention, there is provided the very-high pressure generator of the second feature, wherein the insert block of each of the lower and upper base blocks has at least a series of holes which are made from its bottom toward its top along its center axis, uniformly in cross section and depth, at the same radial distance from, and at equal angular intervals around, its center axis.

According to the fourth feature of the present invention, there is provided the very-high pressure generator of the third feature, wherein each of the press blocks of the lower and upper base blocks comprises an anvil to pressurize a pressure-transmitting medium, a base to support the anvil, and a shim set between the anvil and the base.

According to the fifth feature of the present invention, there is provided a very-high pressure generator wherein a guide block is disposed above, and another guide block is disposed below, a pressurizing space. Each of the two guide blocks comprises (i) a disk block which is round as seen from above, (ii) four stoppers formed on each of the bottom and top surfaces of the disk block, at the same radial distance from and at equal angular intervals around the center of the disk block, each stopper having an inner side, and (iii) four sliders on each of the bottom and top surfaces of the disk block, each slider having a back surface and a slope sloping down to its front end. When the back surface of each slider is put into contact with the inner side of an stopper on each of the bottom and top surfaces of each disk block, the four slopes of the four sliders form a pyramidal recess in the shape of a right pyramid with a bottom in the figure of a regular quadrangle.

According to the sixth feature of the present invention, there is provided the very-high pressure generator of the fifth feature, wherein the disk block of the guide block below the pressuring space has a vertical through hole at its center, an insert block is inserted in the through hole, and an anvil is set on the top of the insert block. The disk block of the guide block above the pressuring space has a vertical through hole at its center, an insert block is inserted downward in the through hole, and an anvil is set on the top of the downward insert block.

According to the seventh feature of the present invention, there is provided the very-high pressure generator of the fifth feature, wherein the bottom and top surfaces of each disk block are flat and parallel to each other. The inner side of each stopper on each of the bottom and top surfaces of each disk block is flat and, as seen from above, at right angles with a radial straight line from the center of said disk block to the center of the inner side. Each slider on each of the bottom and top surfaces of each disk block has a flat contact surface to come into contact with the bottom or top surface, as the case may be, of said disk block. The line where the contact surface and the back surface of each slider on each of the bottom and top surfaces of each disk block meet is parallel to the slope of said slider.

According to the eighth feature of the present invention, there is provided the very-high pressure generator of the seventh feature, wherein each stopper on each of the bottom and top surfaces of each disk block has a top surface which is flat and parallel to the bottom or top surface, as the case may be, of said disk block. A raised support portion is formed on and behind the back surface of each slider on each of the bottom and top surfaces of each disk block. The raised support portion of each slider on each of the bottom and top surfaces of each disk block has a support surface at its bottom which is flat and parallel to the bottom or top surface, as the case may be, of said disk block. When each slider is set on a stopper on each of the bottom and top surfaces of each disk block, the support surface of the raised support portion of said slider comes in face-to-face contact with the top surface of the stopper.

According to the ninth feature of the present invention, there is provided the very-high pressure generator of the fifth feature, wherein each slider is provided with a wedge mechanism for adjusting the radial position of said slider. The wedge mechanism is disposed between the back surface of said slider and the inner side of the corresponding stopper.

According to the tenth feature of the present invention, there is provided the very-high pressure generator of the ninth feature, wherein the wedge mechanism of each slider comprises two wedges combined with each other and the radial position of said slider is adjusted by deepening and shallowing the engagement between the two wedges.

The advantage offered by the first feature of this invention is as follows. The press ram is raised to move upward the lower base block and the four slide blocks through the lower pyramidal block and the lower guide block. While the lower guide block is nearing the upper guide block, they press the slide blocks inward. Thus, the lower and upper anvils and the four side anvils pressurize a pressure-transmitting medium surrounded by them.

Because the lower base block is set in the center of the upper upside-down pyramidal recess of the lower guide block, the lower base block is pressed through all its eight pyramidal slopes by the pyramidal slopes of the upper upside-down pyramidal recess of the lower guide block and pyramidal slopes of the inner pyramidal portions of the four slide blocks; therefore the lower base block is not deformed unevenly. Because the upper base block is set in the center of the lower pyramidal recess of the upper guide block, the upper base block is pressed through all its eight pyramidal slopes by the pyramidal slopes of the lower pyramidal recess of the upper guide block and pyramidal slopes of the inner pyramidal portions of the four slide blocks; therefore, the upper base block is not deformed unevenly. The lower pyramidal block exerts pressure on the lower guide block and the upper downward pyramidal block exerts reaction on the upper guide block. The pressure on the lower guide block exerted by the lower pyramidal block and the reaction on the lower guide block exerted by the lower base block and the slide blocks are evenly balanced. The pressure on the upper guide block exerted by the upper base block and the slide blocks and the reaction on the upper guide block exerted by the upper downward pyramidal block are evenly balanced. Therefore, no bending moment acts on the lower and upper guide blocks and they are not deformed. Accordingly, the supporting conditions of the lower and upper anvils and the supporting conditions of the side anvils are equalized. The very-high pressure generator is, therefore, capable of pressurizing a pressure-transmitting medium into the shape of a desired cube accurately. Even when pressure over 1,000 tons is required, a relatively small frame will do.

The advantage offered by the second feature of this invention is as follows. The press ram is raised to move upward the lower base block through the lower pyramidal block and the four slide blocks through the lower pyramidal block and the lower guide block. While the lower guide block is nearing the upper guide block, they press the slide blocks inward. Thus, the lower and upper anvils and the four side anvils pressurize a pressure-transmitting medium surrounded by them. When the pressure-transmitting medium is pressurized, the reaction on the lower and upper anvils is received by the insert blocks of the lower and upper base blocks and the reaction on the side anvils is received by the lower and upper guide blocks; therefore, by optimizing the rigidity of the lower and upper insert blocks and the lower and upper guide blocks, the supporting conditions of the lower and upper anvils and the supporting conditions of the side anvils can be made equal. Thus, the very-high pressure generator is capable of pressurizing a pressure-transmitting medium into the shape of a desired cube accurately.

The advantage offered by the third feature of this invention is as follows. The rigidity of the insert blocks can be adjusted by changing the number and the depth of holes in them. Because the holes of each insert block are arranged at the same radial distance from and at equal angular intervals around the center axis of said insert block and given one and the same cross section and the same depth, the rigidity of said insert block is symmetric with respect to its center axis The advantage offered by the fourth feature of this invention is as follows. If the manufacturing error of one of the lower and upper guide blocks, the lower and upper base blocks, and the slide blocks exceeds the tolerance, the face-to-face distance between the lower and upper anvils, that between two side anvils opposite to each other, and that between the other two side anvils opposite to each other can be adjusted into within the tolerance by changing the thickness of the shims. The very-high pressure generator is, therefore, capable of pressurizing a pressure-transmitting medium into the shape of a desired cube accurately.

The advantage offered by the fifth feature of this invention is as follows. Just by fitting the sliders onto the stoppers, pyramidal recesses can be formed on the bottom and top surfaces of the disk blocks of the lower and upper guide blocks. Because the disk blocks are almost circular as seen from above, they are easy to machine with a lathe or the like. Because the four stoppers on each of the bottom and top surfaces of each disk block are disposed at the same radial distance from and at 90° intervals around the center of said disk block, the four stoppers on the bottom surface and those on the top surface of each disk block can be formed dimensionally accurately and in exactly the same phase. Because the sliders are made separately from the disk blocks, the slopes, contact surfaces, back surfaces, etc. of two or more sliders can be machined at a time after both sides of each slider are machined; therefore, two or more sliders can be machined into one and the same shape, given identical dimensions and angles.

The advantage offered by the sixth feature of this invention is as follows. The rigidity of the lower and upper insert blocks can be adjusted independently of the rigidity of the lower and upper guide blocks; therefore, the rate of change of the face-to-face distance between the side anvils can be made equal to that of the face-to-face distance between lower and upper anvils under increasing pressure.

The advantage offered by the seventh feature of this invention is as follows. Just by putting the contact surfaces of the sliders in face-to-face contact with the bottom or top surfaces of the disk blocks and putting the back surfaces of the sliders in contact with the inner sides of the stoppers, the slopes of the sliders are directed exactly to the centers of the disk blocks. Because (i) the four stoppers on each of the bottom and top surfaces of each disk block are disposed at 90° intervals around the center of said disk block and (ii) the inner side of each of the four stoppers is flat and, as seen from above, at right angles with a radial straight line from the center of said disk block to the center of the inner side, the four slopes of the four sliders on said surface of said disk block form a recess in the shape of a right pyramid with a bottom in the figure of a regular quadrangle, the vertex of the pyramid resting on the center of said disk block. The inner side of each stopper on each disk block is vertical, or perpendicular, to the bottom or top surface, as the case may be, of said disk block; accordingly, the stoppers can easily be machined accurately in shape and in position on said disk block.

The advantage offered by the eighth feature of this invention is as follows. The contact surface of each slider on each disk block is put in face-to-face contact with the bottom or top surface, as the case may be, of said disk block and, at the same time, the support surface of said slider is put in face-to-face contact with the top surface of a stopper on said disk block. Besides, the sliders are simple in shape and hence can easily be machined accurately into one and the same shape, given identical dimensions and angles. Accordingly, the four slopes of the four sliders on each of the lower and upper surfaces of each disk block form more accurately a recess in the shape of a right pyramid with a bottom in the figure of a regular quadrangle, the vertex of the pyramid resting on the center of said disk block; therefore, the very-high pressure generator is capable of pressurizing a pressure-transmitting medium accurately.

The advantage offered by the ninth feature of this invention is as follows. By adjusting the distance of each slider from the corresponding stopper with a wedge mechanism, the radial distance of said slider from the center of the disk block can be adjusted. Accordingly, if there occur relatively large errors in machining the sliders, the four pyramidal recesses can be formed accurately in one and the same shape and phase on the four lower and upper surfaces of the disk blocks.

The advantage offered by the tenth feature of this invention is as follows. By deepening and shallowing the engagement of the two wedges, the distance of each slider from the corresponding stopper can be adjusted. Accordingly, if there occur relatively large errors in machining the sliders, the four pyramidal recesses can be formed accurately and in one and the same shape and phase on the four lower and upper surfaces of the disk blocks.

BRIEF DESCRIPTION OF THE DRAWINGS

The features and advantages of the present invention will become more clearly appreciated from the following description in conjunction with the accompanying drawings, in which.

DETAILED DESCRIPTION OF THE PREFERRED EMBODIMENT

Figure 1:
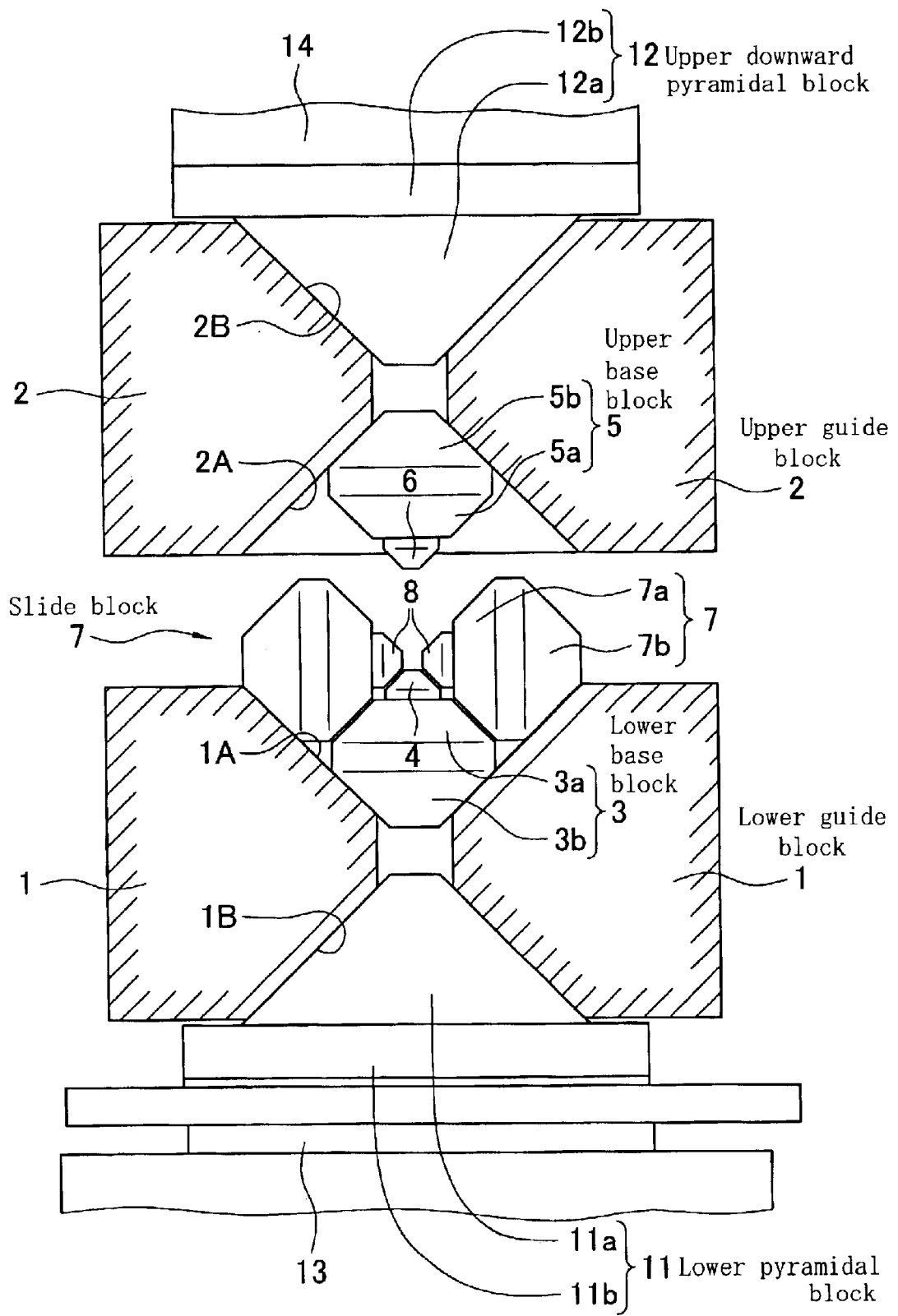
FIG. 1 is a schematic sectional front view of an embodiment of very-high pressure generator of the present invention.
Figure 2:
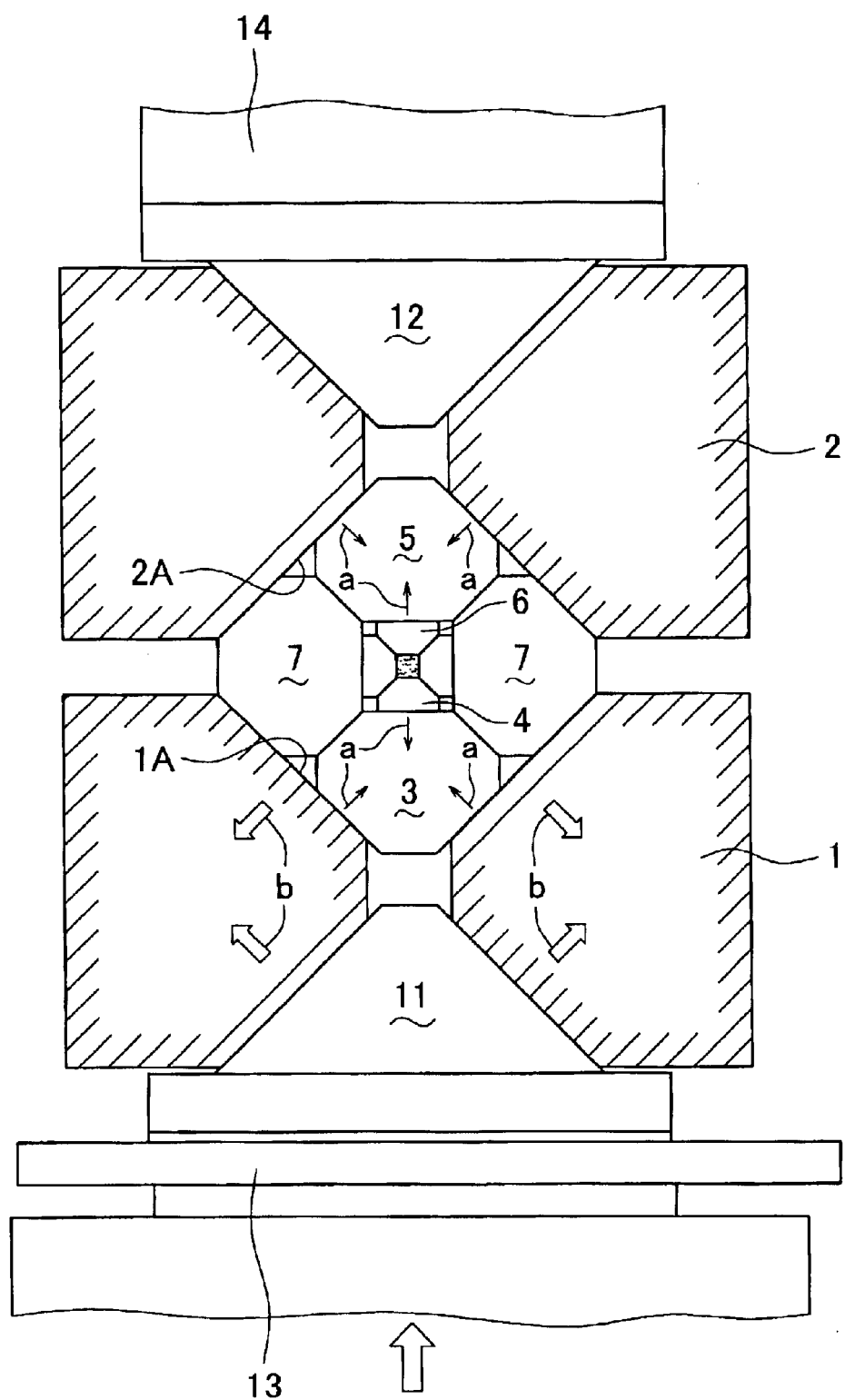
FIG. 2 is a schematic illustration to show the state of the very-high pressure generator of FIG. 1 when it has fully pressurized a pressure-transmitting medium.

Referring to the drawings, a preferred embodiment of very-high pressure generator of the present invention will now be described.

In FIG. 1 of the drawings, reference numeral 1 is a lower guide block; 2, an upper guide block; 3, a lower base block; 5, an upper base block; 7, four slide blocks; 11, a lower pyramidal block; and 12, an upper downward pyramidal block.

The lower guide block 1 has (i) four lower slopes 1B which slope up toward the center of the block to define a pyramidal recess which a pyramidal portion 11a (to be described later) of the lower pyramidal block 11 fits into and (ii) four upper slopes 1A which slope down toward the center of the block to define an upside-down pyramidal recess which a lower upside-down pyramid portion 3b (to be described later) of the lower base block 3 fits into. The lower guide block 1 is symmetric with respect to its horizontal center plane.

The upper guide block 2 has (i) four lower slopes 2A which slope up toward the center of the block to define a pyramidal recess which an upper pyramidal portion 5b (to be described later) of the upper base block 5 fits into and (ii) four upper slopes 2B which slope down toward the center of the block to define an upside-down pyramidal recess which a pyramidal portion 12a (to be described later) of the upper downward pyramidal block 12 fits into. The upper guide block 2 is symmetric with respect to its horizontal center plane.

The lower base block 3 has a lower upside-down pyramidal portion 3b and an upper pyramidal portion 3a and is symmetric with respect to its horizontal center plane. Each of the lower upside-down pyramidal portion 3b and the upper pyramidal portion 3a is in the shape of a frustum of a right pyramid with a bottom in the figure of a regular quadrangle. A lower anvil 4 is set on the top of upper pyramidal portion 3a.

The upper base block 5 has a lower upside-down pyramidal portion 5a and an upper pyramidal portion 5b and is symmetric with respect to its horizontal center plane. Each of the lower upside-down pyramidal portion 5a and the upper pyramidal portion 5b is in the shape of a frustum of a right pyramid with a bottom in the figure of a regular quadrangle. An upper anvil 6 is set on the pyramidal top of the lower upside-down pyramidal portion 5a.

Each of the four slide blocks 7 has an inner pyramidal portion 7a laid laterally inward and an outer pyramidal portion 7b laid laterally outward. The inner and outer pyramidal portions 7a and 7b of each slide block 7 are symmetric with respect to the vertical center plane between them. Each of the inner and outer laterally laid pyramidal portions 7a and 7b of each slide block 7 is in the shape of a frustum of a right pyramid with a bottom in the figure of a regular quadrangle. A side anvil 8 is set on the pyramidal top of the inner pyramidal portion 7a of each slide block 7.

The lower pyramidal block 11 has a base portion 11b and a pyramidal portion 11a formed on the base portion 11b. The pyramidal portion 11a is in the shape of a frustum of a right pyramid with a bottom in the figure of a regular quadrangle.

The upper downward pyramidal block 12 has a base portion 12b and a pyramidal portion 12a formed on the base portion 12b and is disposed downward. The pyramidal portion 12a is in the shape of a frustum of a right pyramid with a bottom in the figure of a regular quadrangle.

Reference numeral 13 is a ram of a press; 14, part of a frame of the press. The positions of the press ram 13 and the press frame 14 may be reversed.

In the embodiment of FIG. 1, the press ram 13, the lower pyramidal block 11, the lower guide block 1, and the lower base block 3 are arranged from bottom to top. The press frame 14, the upper downward pyramidal block 12, the upper guide block 2, and the upper base block 5 are arranged from top to bottom. The four slide blocks 7 are arranged around the lower and upper base blocks 3 and 5. The inner pyramidal portion 7a of each slide block 7 is disposed so as to slide along a slope of the upper pyramidal portion 3a of the lower base block 3 and a slope of the lower upside-down pyramid portion 5a of the upper base block 5. The outer pyramidal portion 7b of each slide block 7 is disposed so as to slide along an upper slope 1A of the lower guide block 1 and a lower slope 2A of the upper guide block 2.

The workings of the very-high pressure generator will be described next.

In FIG. 1, the press ram 13 is raised to move upward the lower base block 3 and the four slide blocks 7 through the lower pyramidal block 11 and the lower guide block 1. When the four slide blocks 7 come into contact with the upper guide block 2 and the upper base block 5, the upward movement is checked by the reaction exerted by the press frame 14 through the upper downward pyramidal block 12, the upper guide block 2, and the upper base block 5. When the pressure of the press ram 13 is further raised, the four slide blocks 7 are pressed inward by the upper slopes 1A of the lower guide block 1 and the lower slopes 2A of the upper guide block 2. The generator is so configured that the face-to-face distance between the lower anvil 4 and the upper anvil 6, that between two side anvils 8 opposite to each other, and that between the other two side anvils 8 opposite to each other are uniform when the generator exerts the prescribed very high pressure to a pressure-transmitting medium in the space surrounded by the six anvils.

The very-high pressure generator has the following features.

(1) The lower base block 3 is disposed in the center of the upper slopes 1A of the lower guide block 1 and the upper base block 5 is disposed in the center of the lower slopes 2A of the upper guide block 2. Accordingly, the four upper slopes 1A of the lower guide block 1, the inner pyramidal portions 7a of four slide blocks 7, and the lower anvil 4 press nine surfaces of the lower base block 3 in the directions indicated by arrows "a" (toward the center of the lower base block 3) and the four lower slopes 2A of the upper guide block 2, the inner pyramidal portions 7a of four slide blocks 7, and the upper anvil 6 press nine surfaces of the upper base block 5 in the directions indicated by arrows "a" (toward the center of the upper base block 5); therefore, neither the lower base block 3 nor the upper base block 5 is not deformed unevenly.

(2) The lower pyramidal block 11 exerts pressure on the lower guide block 1 and the upper downward pyramidal block 12 exerts reaction on the upper guide block 2. The pressure (indicated by arrow "b") on the lower guide block 1 exerted by the lower pyramidal block 11 and the reaction (indicated by arrow "b") on the lower guide block 1 exerted by the lower base block 3 and the slide blocks 7 are evenly balanced. The pressure on the upper guide block 2 exerted by the upper base block 5 and the slide blocks 7 and the reaction on the upper guide block 2 exerted by the upper downward pyramidal block 12 are evenly balanced. Therefore, no bending moment acts on the lower and upper guide blocks 1 and 2 and hence they are not deformed.

(3) Accordingly, the support conditions of all the six anvils are made uniform. The very-high pressure generator is, therefore, capable of pressurizing a pressure-transmitting medium into the shape of a desired cube accurately. Even when pressure over 1,000 tons is required, a relatively small frame will do; therefore, the very-high pressure generator can be kept relatively compact and light.

Referring to FIGS. 3 to 7, another preferred embodiment of very-high pressure generator of the present invention will be described.

Figure 3:
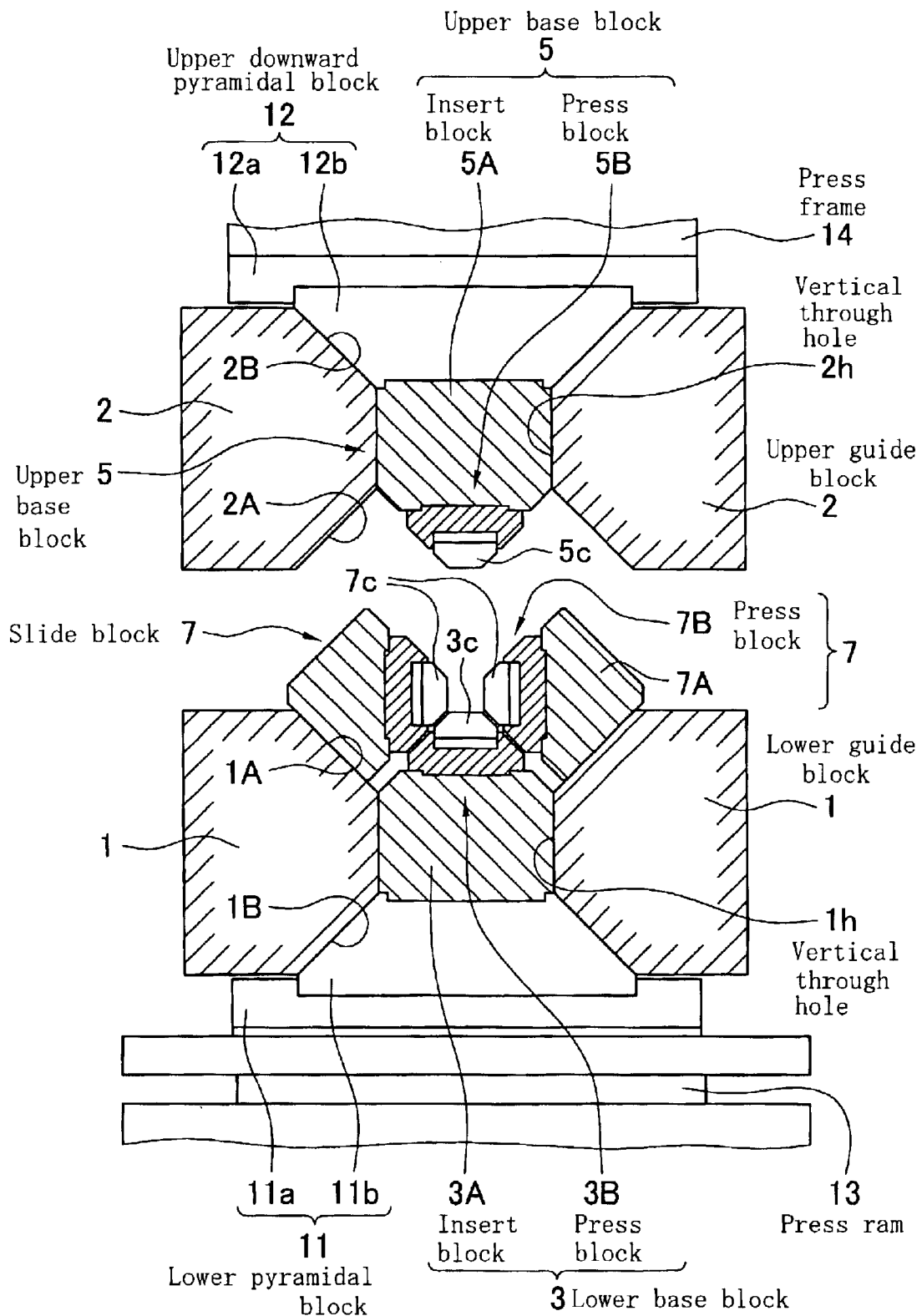
FIG. 3 is a schematic sectional front view of another embodiment of very-high pressure generator of the present invention.
Figure 4:
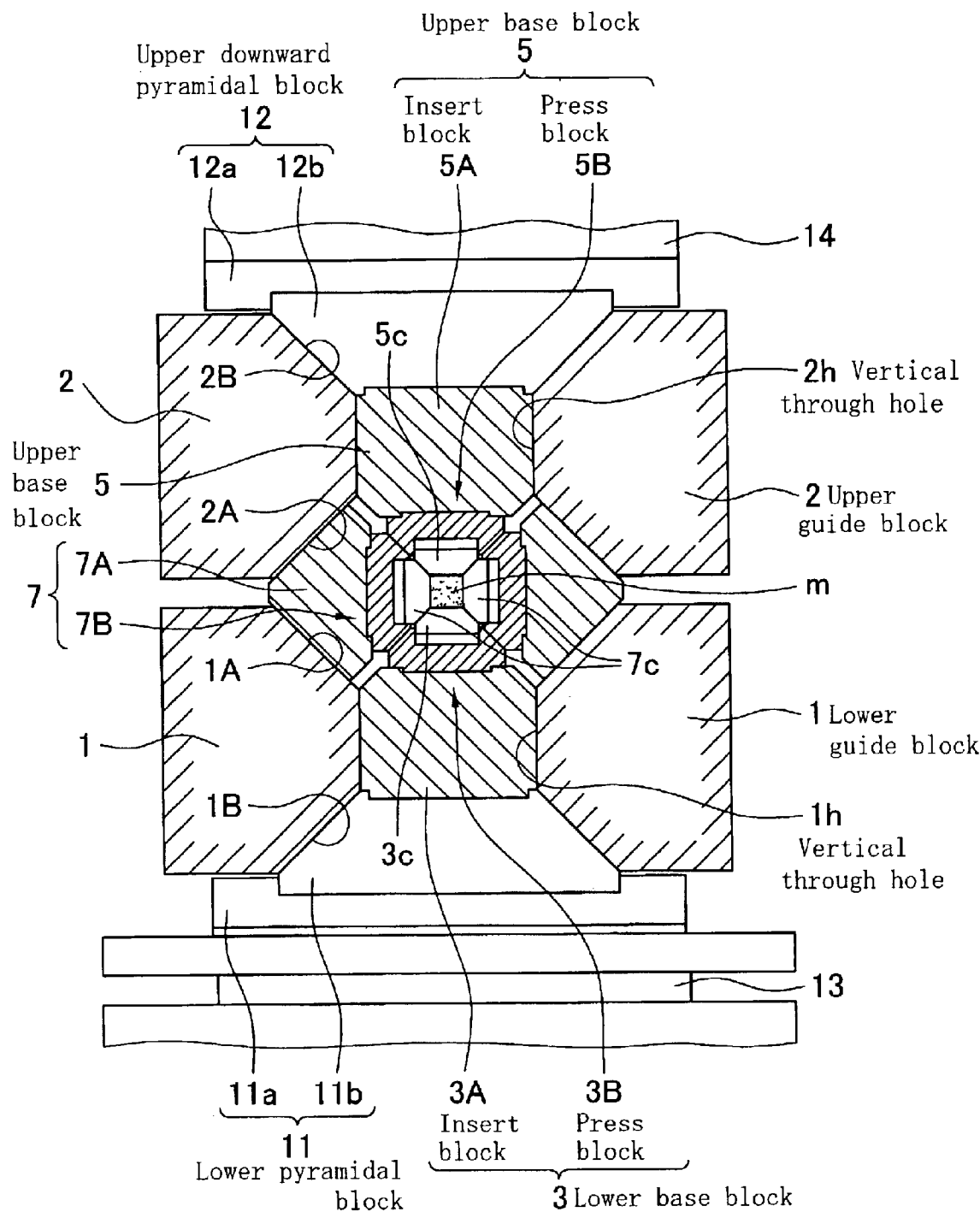
FIG. 4 shows a schematic illustration to show the state of the very-high pressure generator of FIG. 3 when it has fully pressurized a pressure-transmitting medium.
Figure 5:
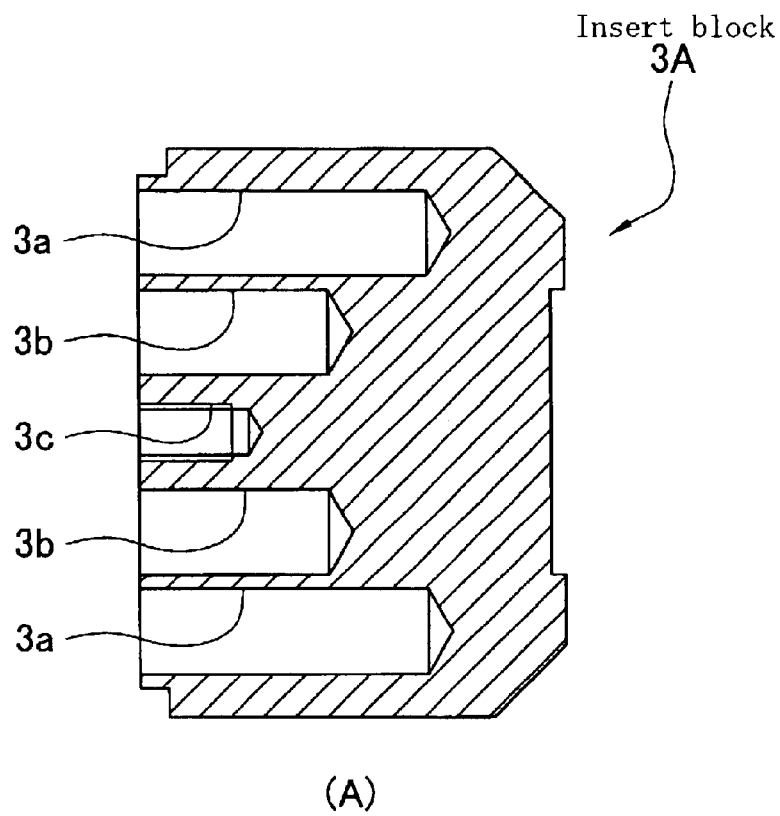
FIGS. 5(A) and 5(B) are a longitudinal sectional view and a bottom plan view, respectively, of the insert block of the lower base block of the very-high pressure generator of FIG. 3.
Figure 5:
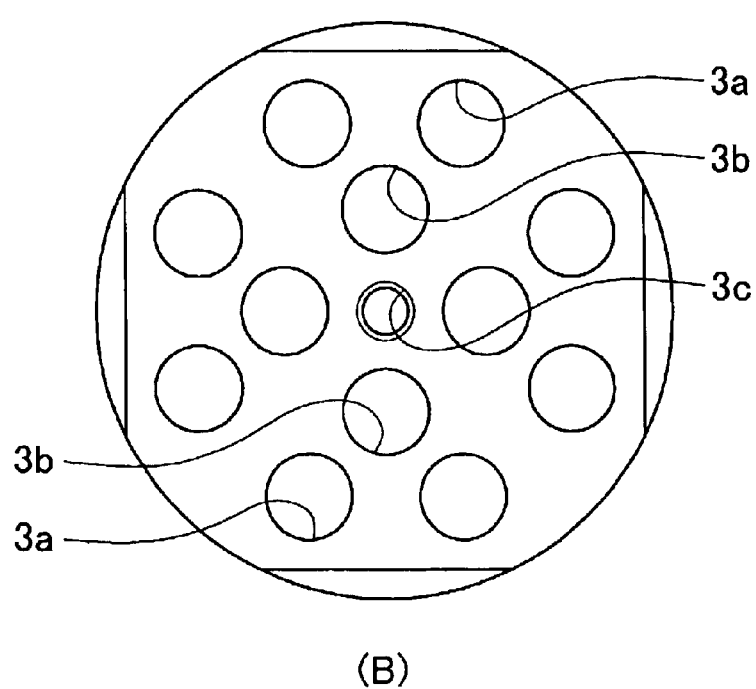

As shown in FIGS. 3 and 4, the features of this second embodiment as compared with the first embodiment are as follows.

(1) The lower base block 3 comprises an insert block 3A and a press block 3B set on the insert block 3A. The press block 3B comprises a base 3a, a shim 3b, and an anvil 3c as described in detail later. The upper base block 5 comprises an insert block 5A and a press block 5B set on the insert block 5A and is disposed downward. The press block 5B comprises a base 5a, a shim 5b, and an anvil 5c as described in detail later. The lower base block 3 and the upper downward base block 5 are set on the lower pyramidal block 11 and the upper downward pyramidal block 12, respectively. Accordingly, the lower and upper base blocks 3 and 5 are directly pressed by the lower and upper pyramidal blocks 11 and 12, respectively.

(2) The distance from the top of the anvil 3c down to the top of the insert block 3A of the lower base block 3 and the distance from the top of the anvil 5c up to the top of the insert block 5A of the upper downward base block 5 are adjustable. Each of the four slide blocks 7 comprises an inner press block 7B laid laterally inward and an outer pyramidal block 7b laid laterally outward. The inner press block 7B of each slide block 7 comprises a base 7a, a shim 7b, and an anvil 7c as described in detail later. The distance from the top of the anvil 7c to the interface between the inner press block 7B and the outer pyramidal block 7A of each slide block 7 is adjustable.

As shown in FIGS. 3 and 4, the lower guide block 1 and the upper guide block 2 have a vertical through hole 1h and a vertical through hole 2h, respectively, at their centers. The lower base block 3 and the upper downward base block 5 are inserted in the through hole 1h and the through hole 2h, respectively.

The lower base block 3 comprises the insert block 3A and the press block 3B as mentioned above. As shown in FIGS. 5(A) and 5(B), a plurality of holes 3a and 3b are made from its bottom [the left side in FIG. 5(A)] along its center axis toward its top, and a hole 3c is made at its center to fix it on the lower pyramidal block 11.

As shown in FIGS. 5(A) and 5(B), at least three holes 3a are arranged at the same radial distance from and at equal angular intervals around the center axis of the insert block 3A and given one and the same cross section and the same depth. Besides, at least three holes 3b are arranged at the same radial distance from and at equal angular intervals around the center axis of the insert block 3A and given one and the same cross section and the same depth.

Accordingly, the rigidity of the insert block 3A can be adjusted by changing the numbers and the depth of holes 3a and 3b. Besides, the rigidity of the insert block 3A can be kept symmetric with respect to its center axis because the holes 3a are symmetrically arranged around the center axis of the insert block 3A, given one and the same cross section and the same depth, and the holes 3b are symmetrically arranged around the center axis of the insert block 3A, given one and the same cross section and the same depth.

Moreover, the depth of holes 3a is deeper than that of holes 3b as shown in FIG. 5(A). In other words, although holes arranged symmetrically at the same radial distance from the center axis of the insert block 3A have to have the same depth and one and the same cross section, the depth and the cross section of holes arranged at a radial distance may be different from those of holes arranged at another radial distance. Accordingly, the rigidity of the insert block 3A can be freely adjusted, without disturbing its symmetry of rigidity, by changing the number, depth, and cross section of its holes.

Holes 3a and 3b may be through ones along the center axis of the insert block 3A.

Furthermore, any other methods of adjusting the rigidity of the insert block 3A may be adopted so long as the symmetry of its rigidity is maintained.

The press block 3B is in the shape of a frustum of a right pyramid with a bottom in the figure of a regular quadrangle and set on the top of the insert block 3A, and its top portion is the lower anvil 3c. The details of the press block 3B will be described later.

The upper downward base block 5 comprises the insert block 5A and the press block 5B as mentioned earlier. The insert block 5A is identical with the insert block 3A except that the former is disposed downward while the latter is disposed upward; accordingly, a plurality of holes (not shown) are made downward from the bottom surface of the insert block 5A.

Thus, the rigidity of the insert block 5A can be adjusted by changing the number, depth, and cross section of its holes. Besides, the rigidity of the insert block 5A is symmetric with respect to its center axis because all the holes at one and the same radial distance from the center axis of the insert block 5A are arranged at equal angular intervals around the center axis and have one and the same cross section and the same depth.

Moreover, the rigidity of the insert block 5A can be freely adjusted without disturbing its symmetry of rigidity by changing the number, depth, and cross section of its holes so long as the symmetry of its holes is not disturbed.

Such holes may be through ones along the center axis of the insert block 5A.

Furthermore, any other methods of adjusting the rigidity of the insert block 5A may be adopted so long as the symmetry of its rigidity is maintained.

The press block 5B is in the shape of a frustum of a right pyramid with a bottom in the figure of a regular quadrangle and set on the top of the insert block 5A, and its top portion is the upper anvil 5c. The details of the press block 5B will be described later.

As mentioned earlier, each slide block 7 comprises an inner pyramidal press block 7B laid laterally inward and an outer pyramidal block 7A laid laterally outward and the pyramidal top portion of the inner press block 7B is an anvil 7c.

The press blocks 3B, 5B, and 7B will be described below. Because they have one and the same configuration, only the press block 5B of the upper downward base block 5 will be described.

Figure 6:
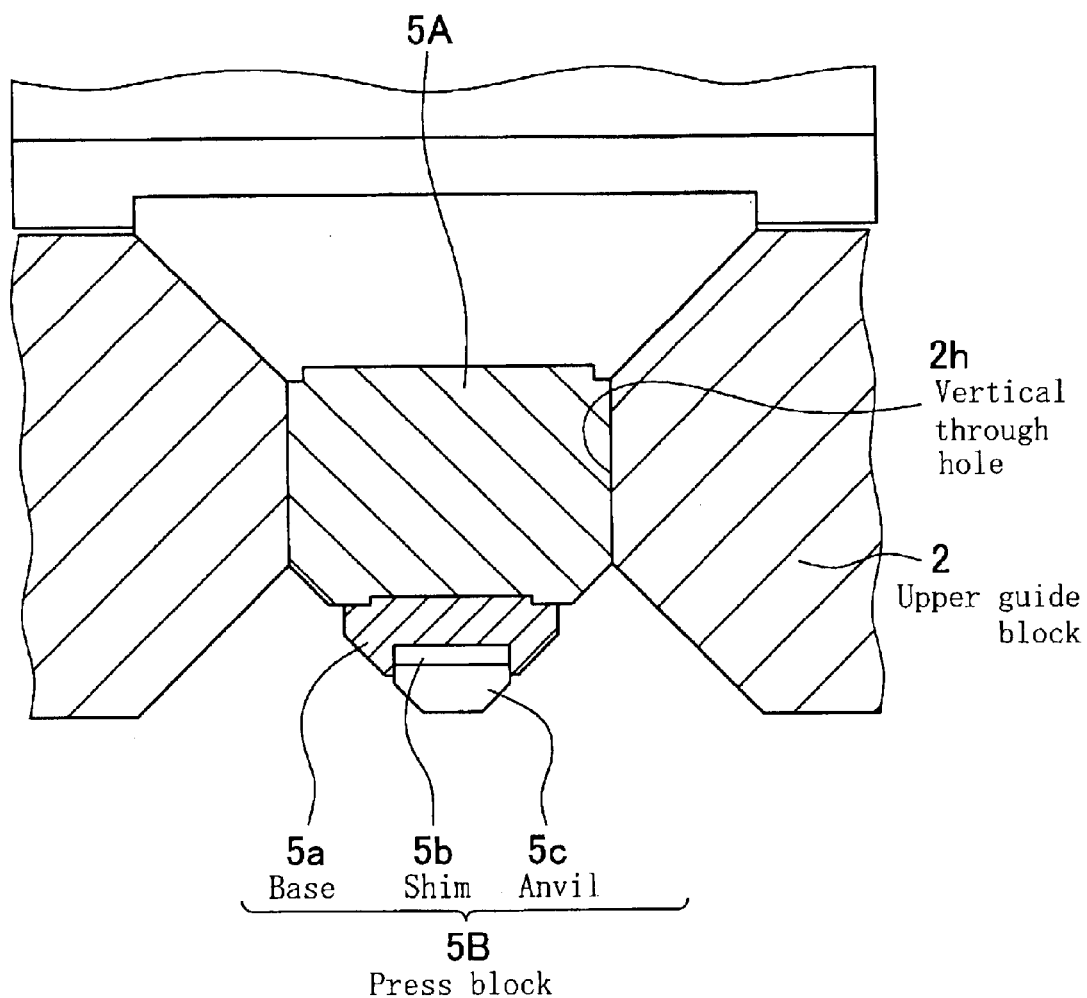
FIG. 6 is an enlarged longitudinal sectional view of the press block of the upper base block of the very-high pressure generator of FIG. 3.

As is mentioned earlier, the press block 5B comprises a base 5a, a plate-like shim 5b, and an anvil 5c. The base 5a is in the shape of a frustum of a right pyramid with a bottom in the figure of a regular quadrangle. As is shown in FIG. 6, the base 5a is set on the top of the downward-disposed insert block 5A and the anvil 5c is set on the base 5a, the shim 5b caught between them.

Thus, the position of the anvil 5c relative to the base 5a can be changed by changing the thickness of the shim 5b; accordingly, the distance from the top of the anvil 5c up to the top of the insert block 5A can be adjusted by changing the thickness of the shim 5b.

In the same way, the distance from the top of the anvil 3c of the press block 3B down to the top of the insert block 3A of the lower base block 3 can be adjusted by changing the thickness of the shim 3b and the distance from the top of the anvil 7c to the interface between the inner press block 7B and the outer pyramidal block 7A can be adjusted by changing the thickness of the shim 7b.

If the manufacturing error of one of the lower and upper guide blocks 1 and 2, the lower and upper base blocks 3 and 5, and the slide blocks 7 exceeds the tolerance, the face-to-face distances between the lower and upper anvils 3c and 5c, that between two side anvils 7c opposite to each other, and that between the other two anvils 7c opposite to each other can be adjusted into within the tolerance by changing the thickness of the shims 3b, 5b, and 7b.

The workings of the very-high pressure generator will be described below.

In FIG. 3, the press ram 13 is raised to move upward the lower base block 3 through the lower pyramidal block 11 and, at the same time, the four slide blocks 7 through the lower pyramidal block 11 and the lower guide block 1. When the four slide blocks 7 come into contact with the upper guide block 2 and the upper downward base block 5, the upward movement is checked by the reaction exerted by the press frame 14 through the upper downward pyramidal block 12, the upper guide block 2, and the upper downward base block 5.

When the pressure of the press ram 13 is further raised, the lower base block 3 is pressed upward to reduce the face-to-face distance between the top of the lower anvil 3c and the top of the upper anvil 5c and, at the same time, the four slide blocks 7 are pressed inward by the upper slopes 1A of the lower guide block 1 and the lower slopes 2A of the upper guide block 2 to reduce the face-top-face distance between the tops of two side anvils 7c opposite to each other and the distance between the tops of the other two side anvils 7c opposite to each other. Thus, very high pressure is applied to a pressure-transmitting medium "M" in the space surrounded by the six anvils 3c, 5c, and 7c.

When the pressure-transmitting medium "M" is pressurized, the reaction on the lower and upper anvils 3c and 5c is received by the insert blocks 3A and 5A of the lower and upper base blocks 3 and 5 and the reaction on the side anvils 7c is received by the lower and upper guide blocks 1 and 2. On the other hand, as described earlier, a plurality of holes are made in the insert blocks 3A and 5A of the lower and upper base blocks 3 and 5 (see FIG. 5) so as to make the rigidity of the insert block 3A and 5A equal to the rigidity of the lower and upper guide blocks 1 and 2. Accordingly, the reduction rates of the face-to-face distances between the side anvils 7c can be made equal to the reduction rate of the face-to-face distance between the lower and upper anvils 3c and 5c under increasing pressure as shown in FIG. 7.

In other words, by optimizing the rigidity of the lower and upper insert blocks 3A and 5A, the face-to-face distances between the side anvils 7c can be made equal to the face-to-face distance between the lower and upper anvils 3c and 5c under increasing pressure and the support conditions of the lower, upper, and side anvils 3c, 5c, and 7c under increasing pressure can be made uniform.

Figure 7:
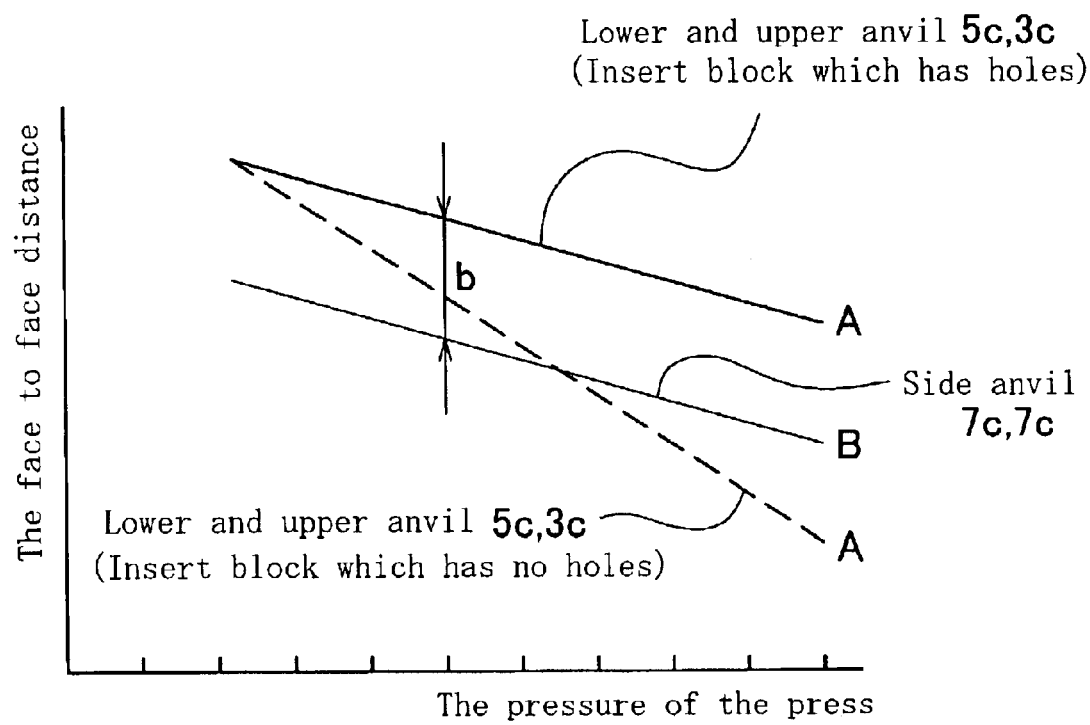
FIG. 7 is a graph showing the relation between the pressure of the press and the face-to-face distances of the thee pairs of anvils of the very-high pressure generator of FIG. 3.

If the manufacturing error of one of the lower and upper guide blocks 1 and 2, the lower and upper base blocks 3 and 5, and the slide blocks 7 exceeds the tolerance, the face-to-face distance "A" between the lower and upper anvils 3c and 5c and those "B" between the side anvils 7c differ by "b" under increasing pressure as shown in FIG. 7. However, by adjusting the thickness of shims 3b, 5b, and 7b, the face-to-face distance "A" between the lower and upper anvils 3c and 5c and those "B" between the side anvils 7c can be made uniform under increasing pressure.

Accordingly, even if the manufacturing errors of the lower and upper guide blocks 1 and 2, etc. are relatively large, material "M" can be pressed into a desired cube or rectangular parallelepiped.

Referring to FIGS. 8 to 12, still another preferred embodiment of very-high pressure generator of the present invention will be described.

Figure 8:
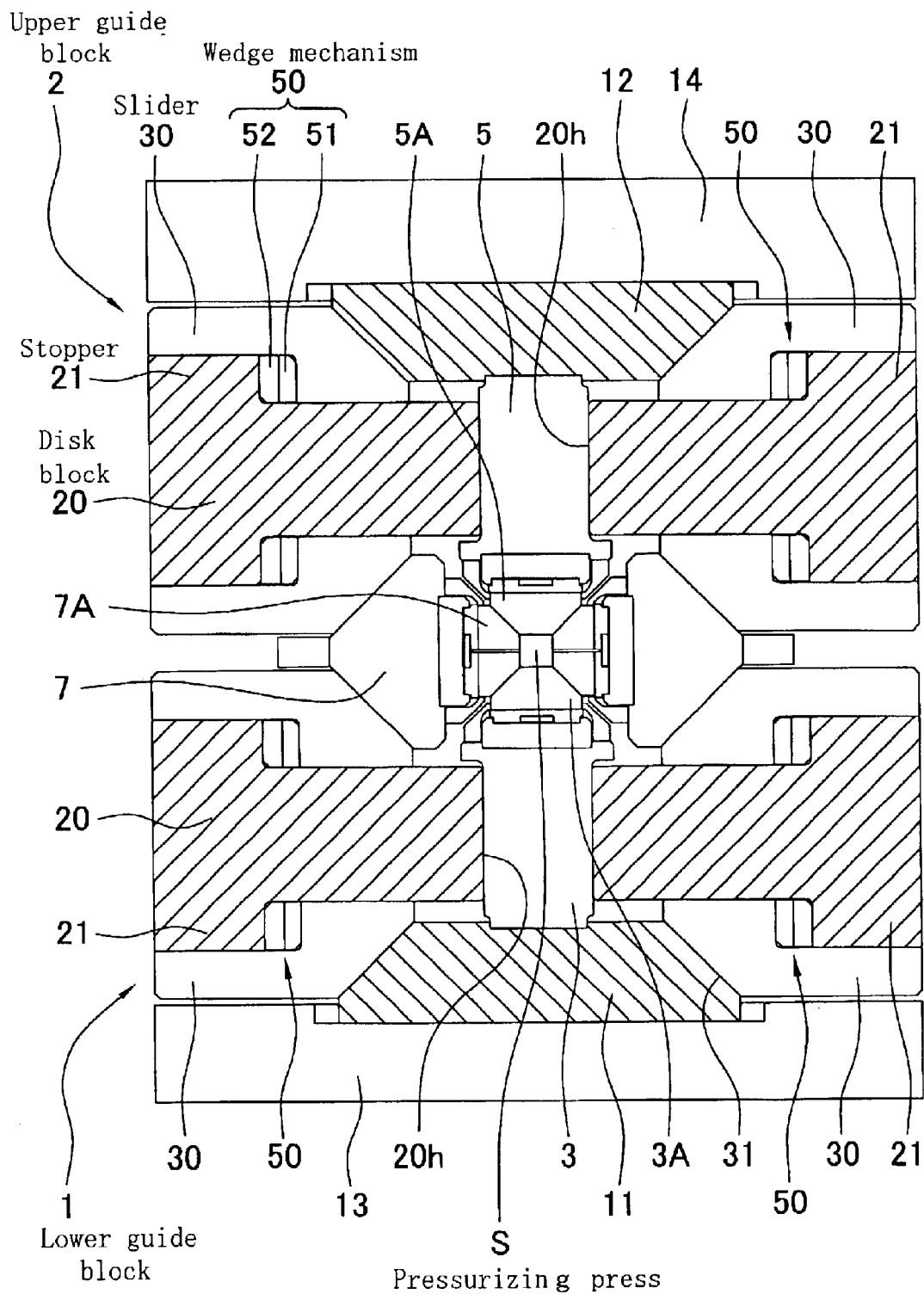
FIG. 8 is a schematic sectional front view of still another embodiment of very-high pressure generator of the present invention.

As shown in FIG. 8, the feature of this third embodiment is a pair of lower and upper guide blocks 1 and 2, each guide block comprising a plurality of components. Because the lower and upper guide blocks 1 and 2 have one and the same configuration, only the upper guide block 2 will be described below.

The upper guide block 2 comprises a disk block 20, eight slider 30, and eight wedge mechanisms 50.

Figure 9:
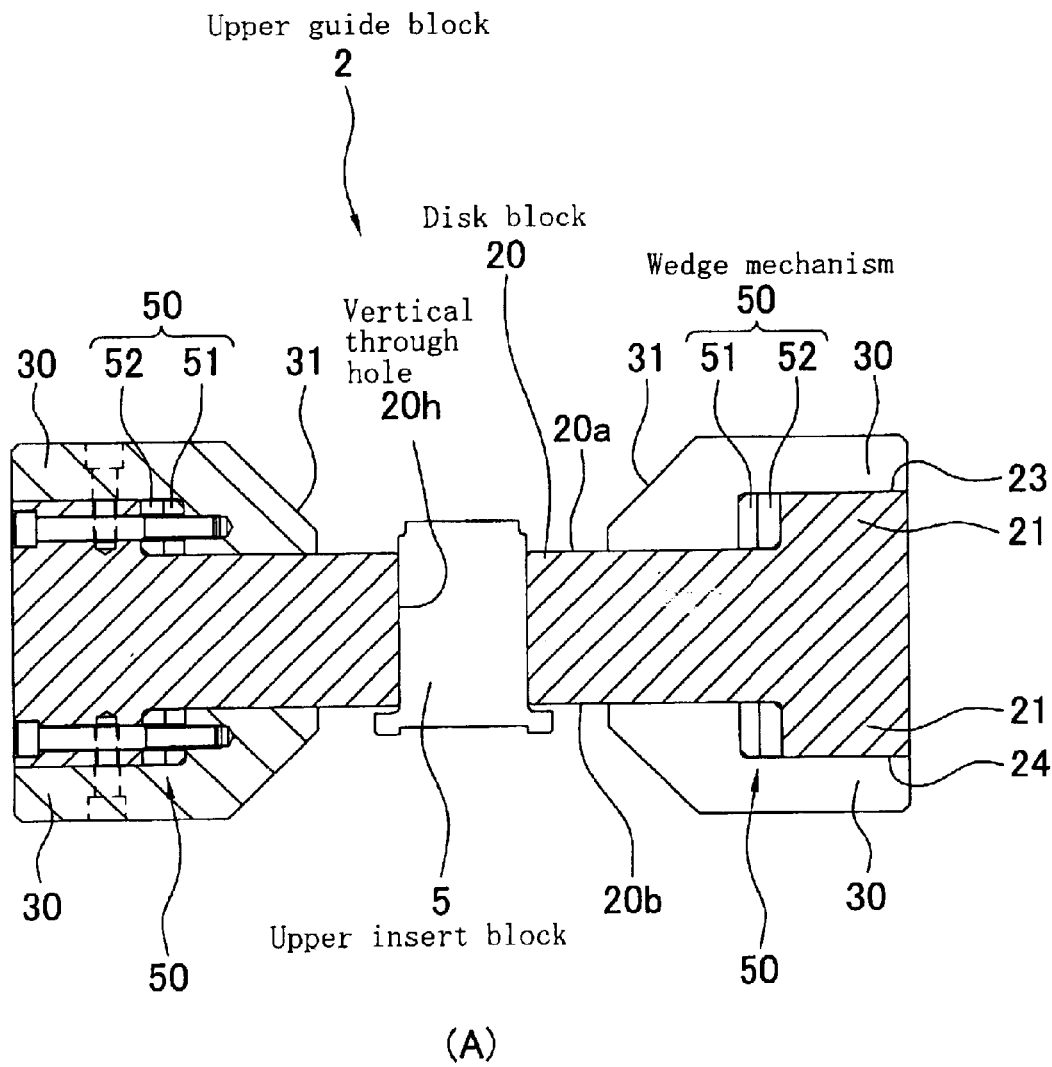
FIG. 9(A) is a schematic longitudinal sectional view of the upper guide block of the very-high pressure generator of FIG. 8
FIG. 9(B) is a side view of a slider of the upper guide block of FIG. 9(A).
Figure 9:
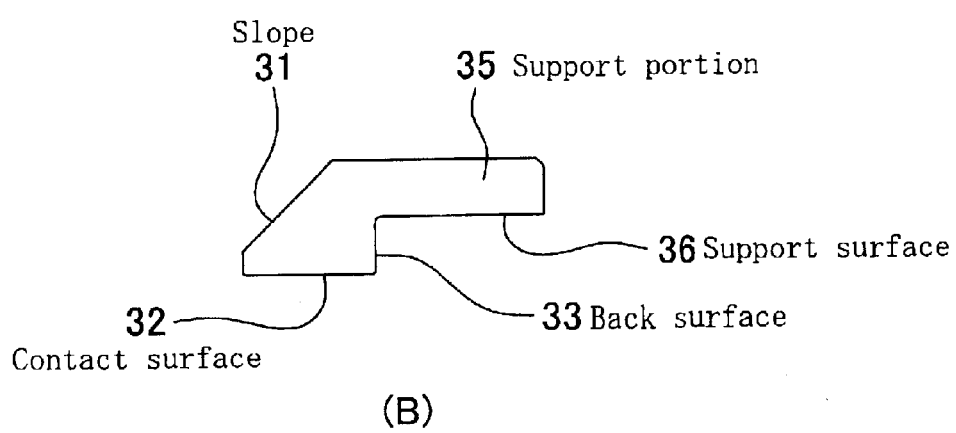
Figure 10:
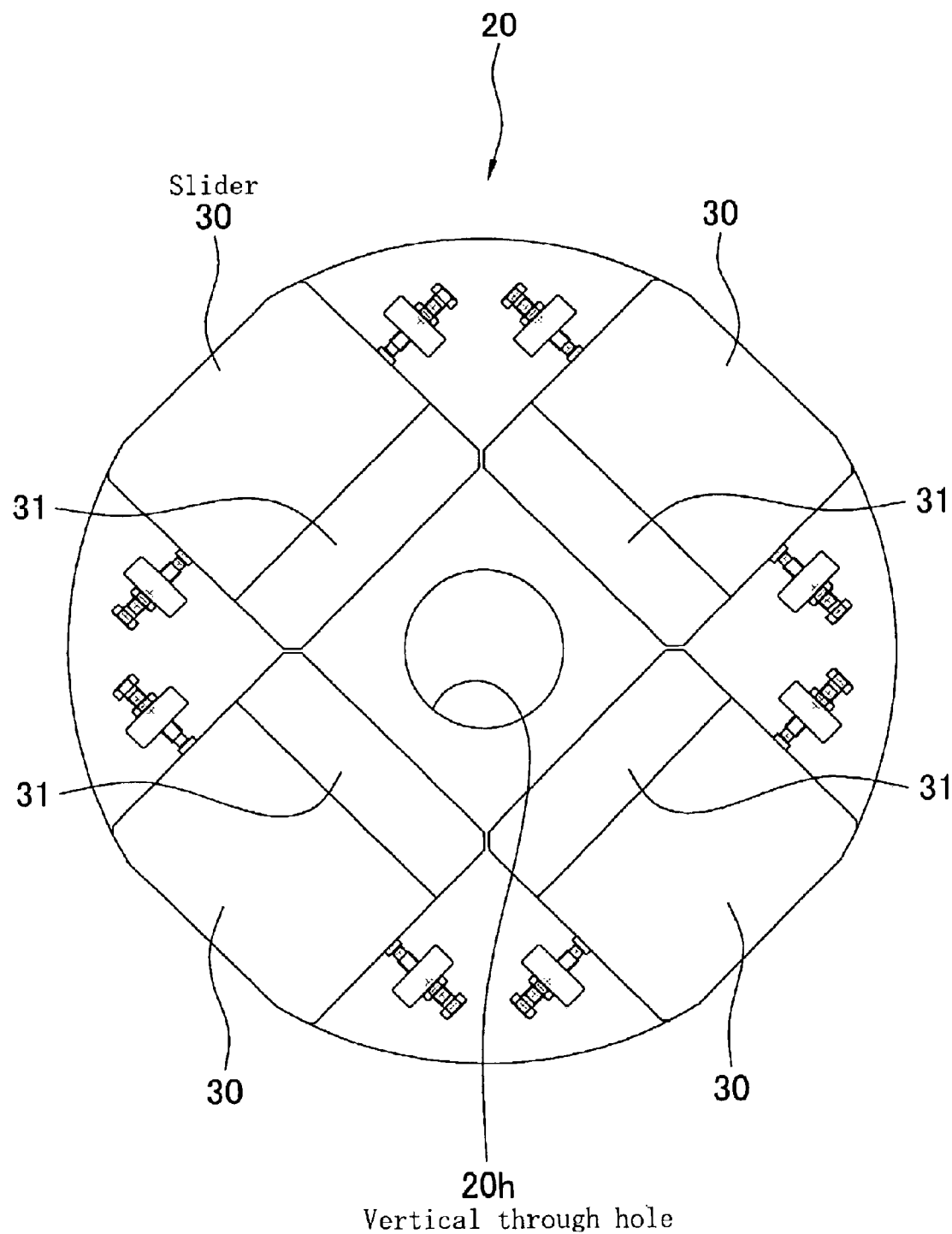
FIG. 10 is a schematic plan view of the disk block of FIG. 9(A)
Figure 11:
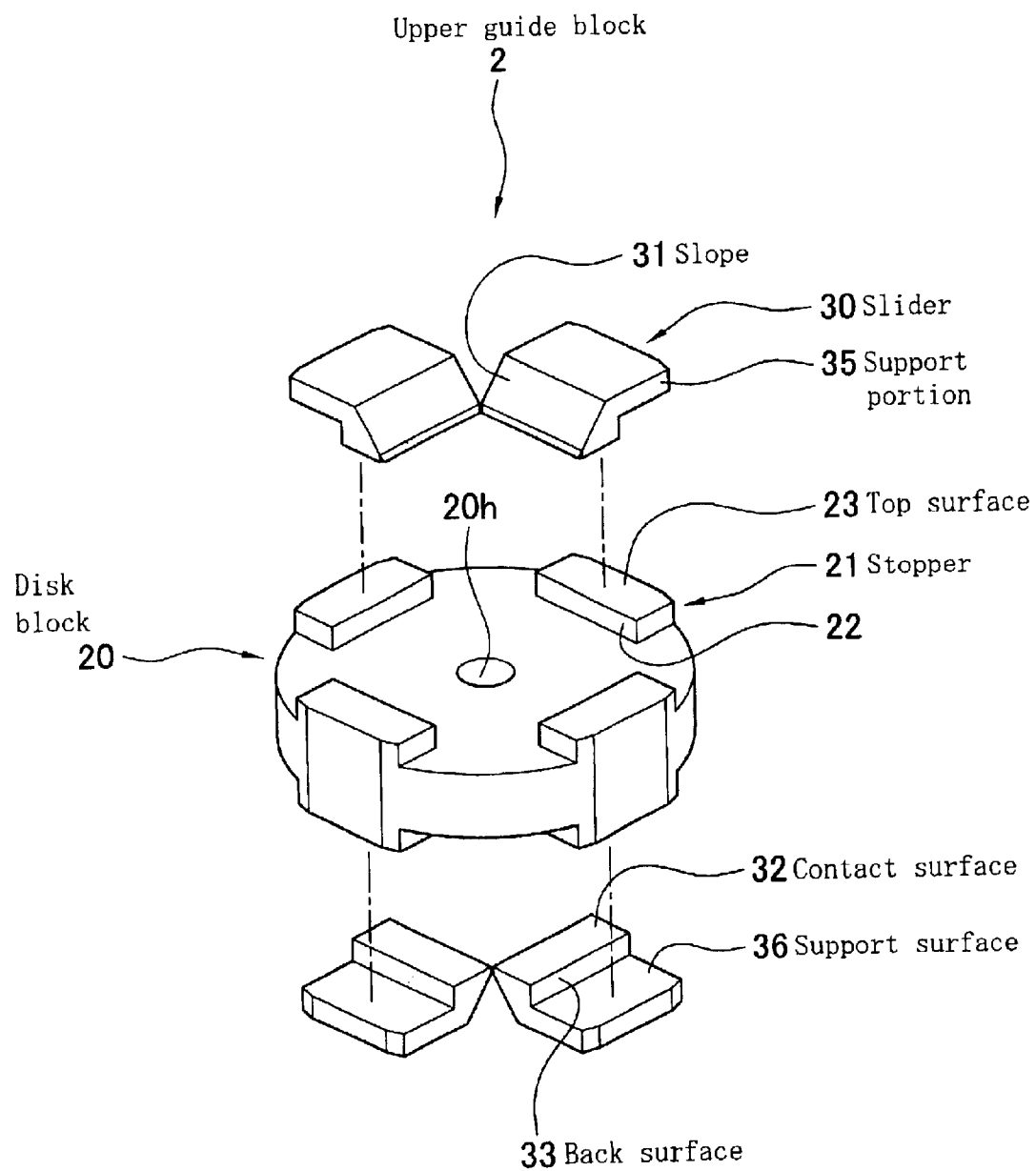
FIG. 11 is a perspective exploded view of the upper guide block of FIG. 9(A).

As is shown in FIGS. 9, 10, and 11, the disk block 20 is almost circular as seen from above and its top surface 20*a* and bottom surface 20*b* are flat and parallel to each other. Made at the center of the disk block 20 is a through hole 20*h* which an upper insert block 5 is inserted into.

Four stoppers 21 are formed on each of the bottom and top surfaces 20*b* and 20*a* of the disk block 20, at the same radial distance from and at 90° intervals around the center of the disk block 20. The phase of the four lower stoppers 21 is the same as the phase of the four upper stoppers 21.

The inner side 22 of each stopper 21 is flat and, as seen from above, at right angles with a radial straight line from the center of the disk block 20 to the center of the inner side 22, of which the reason will be descibed later.

The top surface 24 of each stopper 21 on the bottom surface 20*b* of the disk block 20 is flat and parallel with the bottom surface 20*b* and the top surface 23 of each stopper 21 on the top surface 20*a* of the disk block 20 is flat and parallel with the top surface 20*a*, of which the reason will be described later.

Because the disk block 20 is almost circular as mentioned above, it is easy to machine with a lathe or the like.

Because the four stoppers 21 on each of the bottom and top surfaces of the disk block 20 are formed at the same radial distance from and at 90° intervals around the center of the disk block 20, the four stoppers 21 on the bottom surface 20*b* and the four stoppers 21 on the top surface 20*a* can be formed dimensionally accurately and in one and the same phase with a fraise or the like.

Besides, the stoppers 21 can be formed accurately because (i) the top surface 24 or 23, as the case may be, of each stopper 21 is parallel with the bottom or top surface 20*b* or 20*a*, as the case may be, of the disk block 20 and (ii) the inner side 22 of each stopper 21 is vertical, or perpendicular to the top surface 24 or 23, as the case may be, of said stopper 21 and the bottom or top surface 20*b* or 20*a*, as the case may be, of the disk block 20. Thus, the stoppers 21 can be formed accurately and also they can be positioned accurately with respect to the center of the disk block 20.

As shown in FIG. 9, fitted to each stopper 21 of the disk block 20 is a slider 30 which is made separately from the disk block 20.

Each slider 30 has a flat contact surface 32, a back surface 33 which is disposed behind the contact surface 32 and is vertical, or perpendicular to the contact surface 32, and a raised support portion 35 on and behind the back surface 33. The support portion 35 has a bottom surface 36 (hereinafter called "support surface 36") which is flat and parallel to the contact surface 32. The height of the back surface 33 is the same as the height of the stoppers 21.

Each slider 30 has a slope 31 sloping down toward the front end. The slope 31 of each slider 30 is in parallel with the line where the contact surface 32 and the back surface 33 of said slider 30 meet.

Because the sliders 30 are made separately from the disk block 20 as mentioned above, the slopes 31, contact surfaces 32, back surfaces 33, etc. of two or more sliders 30 can be machined at a time after both sides of each slider 30 are machined. Besides, the sliders 30 are simple in shape; therefore, they can be machined easily, accurately into one and the same shape, given identical dimensions and identical angles between the slope 31 and the contact surface 32 and between the contact surface 32 and the back surface 33.

The wedge mechanisms 50 will be described below.

Figure 12:
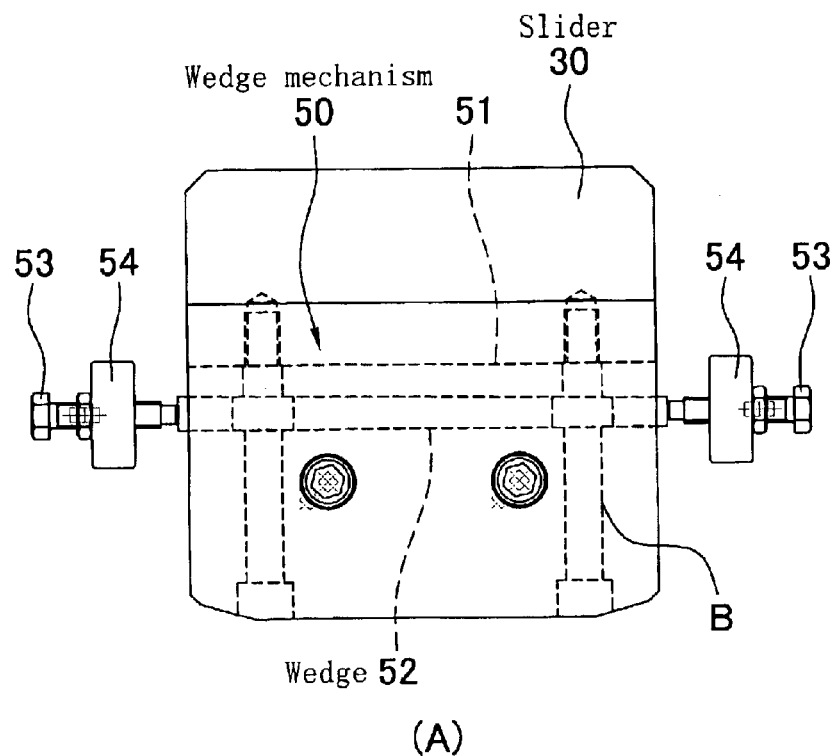
FIG. 12 is an illustration of a wedge mechanism of FIG. 9(A)
Figure 12:
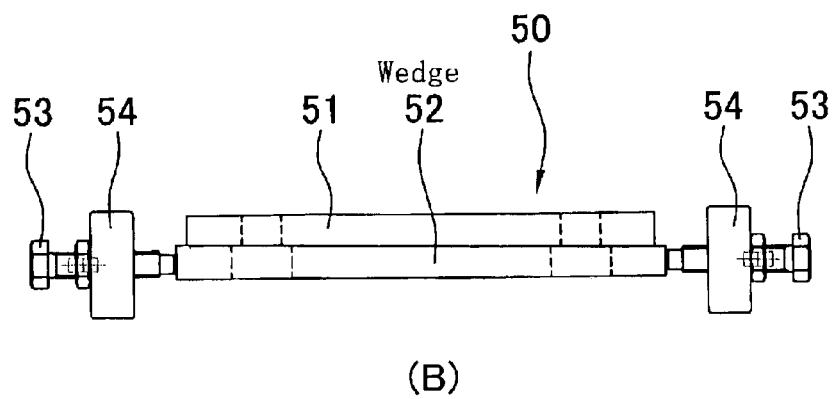
Figure 12:
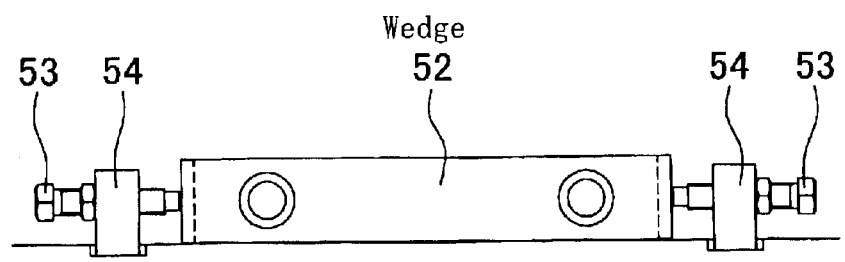
Figure 13:
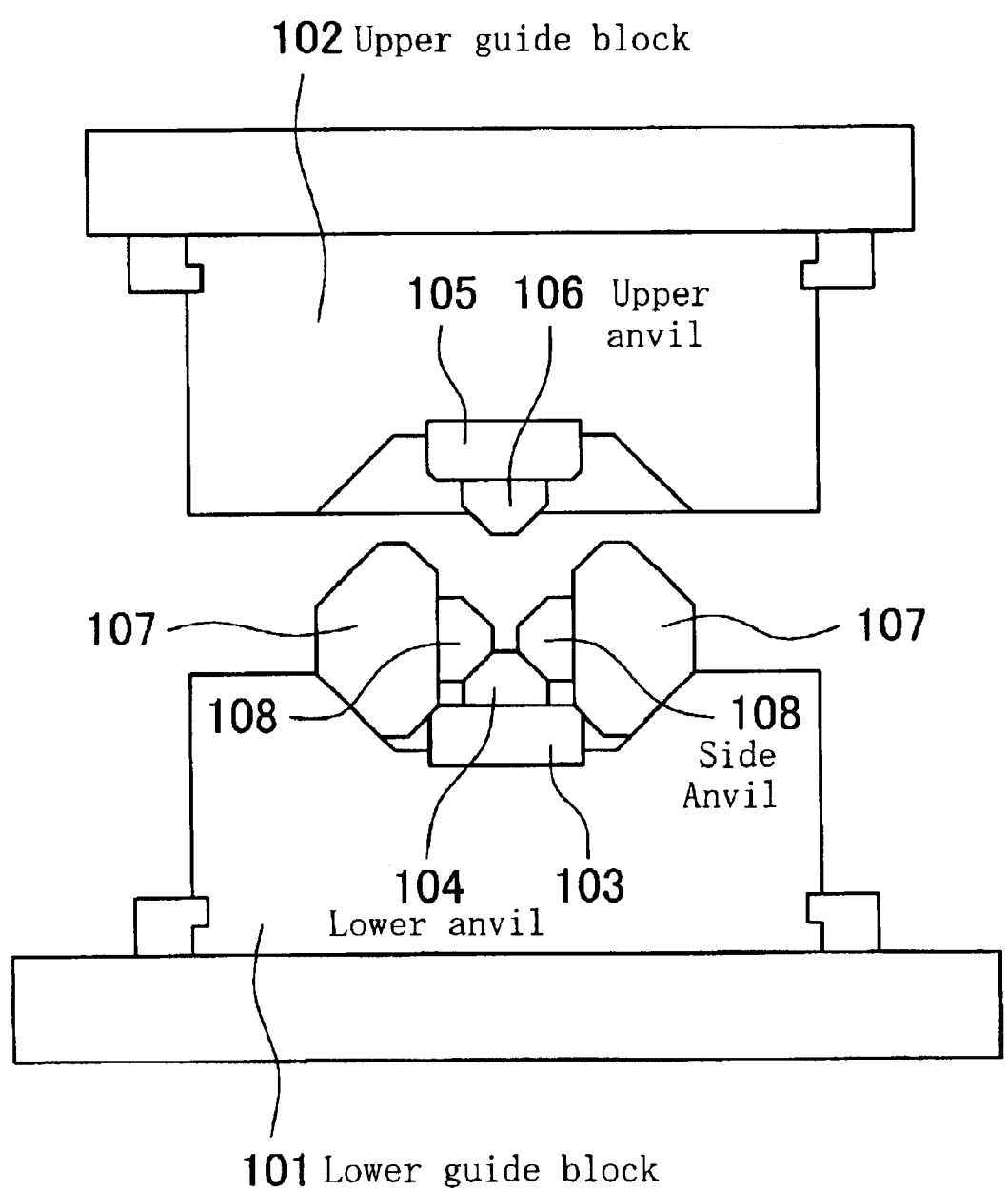
FIG. 13 is a schematic front view of a very-high pressure generator current in use.
Figure 14:
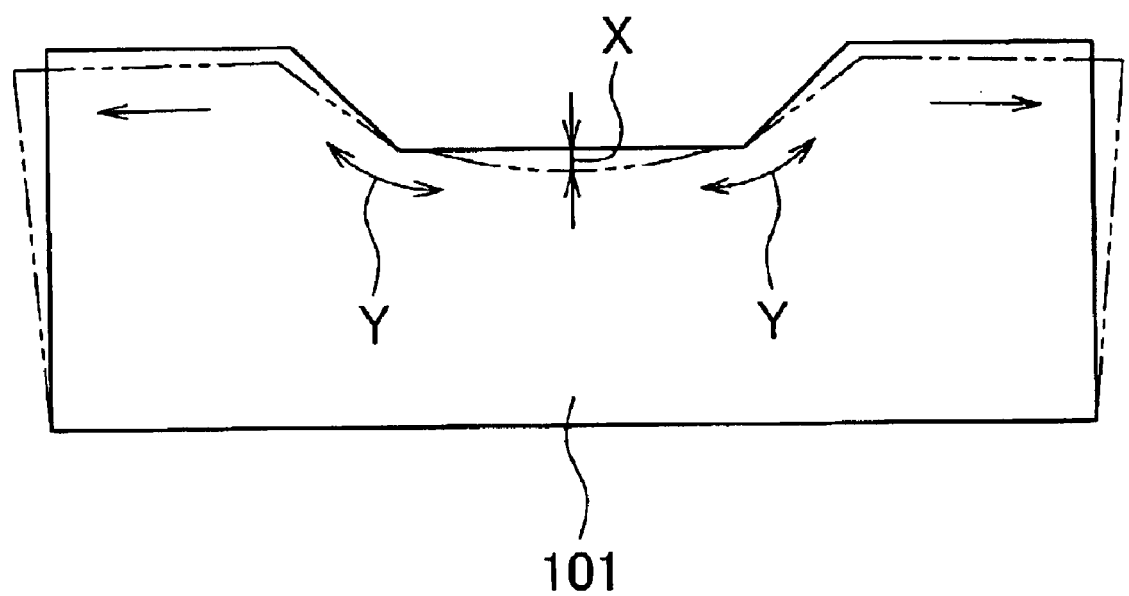
FIG. 14 is an illustration to show the deformation of the lower guide block of the very-high pressure generator of FIG. 13.

As shown in FIG. 12, each set of a stopper 21 and a slider 30 is provided with a wedge mechanism 50 and two wedges 51 and 52 of the wedge mechanism 50 are caught between the back surface 33 of the slider 30 and the inner side 22 of the stopper 21. The wedge 51 in the shape of a tapered rectangular rod is fixed to the back surface 33 of the slider 30. The wedge 52 in the shape of a tapered rectangular rod is disposed between the wedge 51 and the inner side 22 of the stopper 21 so as to be able to move freely in its longitudinal direction, or along the inner side 22 of the stopper 21. The wedge 51 and the wedge 52 taper off at the same rate, but in the directions opposite to each other; accordingly the interface between the wedges 51 and 52 lies at a slight angle with the inner side 22 of the stopper 21.

A support 54 is disposed by one end of the wedge 52; another support 54, by the other end of the wedge 52. A bolt 53 threadedly engages with each of the paired supports 54 so as to put the bottom end of its rod into contact with the corresponding end of the wedge 52.

Accordingly, when one of the paired bolts 53 is turned in a direction and, at the same time, the other bolt 53 is turned in the opposite direction, the wedge 52 moves along the inner side 22 of the stopper 21, moving the slider 30 in radially inward or outward relatively to the stopper 21. Thus, the radial position of the slider 30 can be adjusted with the wedge mechanism 50.

The wedge mechanism 50 may be provided with a means for fixing the slider 30 and wedges 51 and 52 to the stopper 21 so as to prevent the wedge 52 from being displaced to cause the slider 30 to be displaced in a radial direction during operation of the very-high pressure generator. For example, the slider 30, the wedges 51 and 52, and the stopper 21 may be fixed together by bolts penetrating them.

As described above, because the contact surfaces 32 of the four sliders 30 on the top surface 20*a* of the disk block 20 are flat, the sliders 30 have face-to-face contact with the top surface 20*a* of the disk block 20. Each slider 30 is disposed so as to face its back surface 33 to the inner side 22 of a stopper 21 and is fixed to the stopper 21 by a wedge mechanism 50. Accordingly, the four slopes 31 of the four sliders 30 form a pyramidal recess on the top surface 20*a* of the disk block 20.

Because the four sliders 30 on the top surface 20*a* have one and the same angle between their slopes 31 and contact surfaces 32, they have one and the same angle between their slopes 31 and the top surface 20*a* of the disk block 20. Because the four stoppers 21 is arranged at 90° intervals around the center of the disk block 20 and the inner side 22 of each stopper 21 is, as seen from above, at right angles with a radial straight line from the center of the disk block 20 to the center of the inner side 22, the four slopes 31 form a recess in the shape of a frustum of a right pyramid with a bottom in the figure of a regular quadrangle, the vertex of the pyramid resting on the center of the disk block 20.

The top surface 23 of each stopper 21 on the top surface 20*a* of the disk block 20 is flat and parallel to the top surface 20a and the support surface 36 of the support portion 35 of each slider 30 is flat and parallel to the contact surface 32 of said slider 30. In addition, the height of the back surfaces 33 of the four sliders 30 on the top surface 20a of the disk block 20 is the same as the height of the four stoppers 21 on the top surface 20a. Accordingly, when the support surface 36 of each slider 30 is put in face-to-face contact with the top surface 23 of a stopper 21, the contact surface 32 of said slider 30 is put in face-to-face contact with the top surface 20a of the disk block 20. Accordingly, the angle between the slope 31 of each slider 30 and the top surface 20a of the disk block 20 is secured without fail. Thus, the accuracy in shape and position of the pyramidal recess on the top surface 20a of the disk block 20 is further heightened.

In the same way, each slider 30 on the bottom surface 20b of the disk block 20 is set on a stopper 21 on the bottom surface 20b by putting the support surface 36 of said slider 30 into face-to-face contact with the top surface 24 of the stopper 21 and thereby putting the contact surface 32 of said slider 30 into face-to face contact with the bottom surface 20b. Thus, formed on the bottom surface 20b of the disk block 20 is a pyramidal recess of which the four pyramidal slopes are positioned accurately and of which the pyramidal vertex rests on the center of the disk block 20.

In addition, because the phase of the four stoppers 21 on the top surface 20a is the same as the phase of the four stoppers 21 on the bottom surface 20b as described above, the phase of the four slopes of the pyramidal recess on the top surface 20a is exactly the same as the phase of the four slopes of the pyramidal recess on the bottom surface 20b.

Moreover, the radial positions of the four sliders 30 on each of the top and bottom surfaces 20a and 20b can be adjusted with the four wedge mechanisms 50; therefore, the four slopes 31 of the sliders 30 can be positioned accurately even if there happened relatively large errors in machining the sliders 30.

As described above, the paired lower and upper guide blocks 1 and 2 of the third embodiment of very-high pressure generator are each constructed from a plurality of components; accordingly, the components are simple in shape and easy to machine; therefore, they can be machined accurately and hence positioned accurately when assembled.

While the components of the lower and upper guide blocks 1 and 2 are easy to machine, the pyramidal slopes of the pyramidal recesses on the bottom and top surfaces 20b and 20a of their disk blocks 20 can be formed accurately and the pyramidal recesses can be positioned accurately.

It is apparent that although pyramidal components and recesses in the shapes of frustums of right pyramids are used in the above embodiments, they may be in the shapes of right pyramids.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim is:

1. A very-high pressure generator comprising:

a lower pyramidal block which has a base portion and a pyramidal portion formed on the base portion, the pyramidal portion being in the shape of a right pyramid with a bottom in the figure of a regular quadrangle;

a lower guide block which has a pyramidal recess in its bottom surface defined by four uniform slopes sloping up toward the center of the block, the recess being in the shape of a right pyramid with a bottom in the figure of a regular quadrangle, and an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane;

a lower base block which has a lower upside-down pyramidal portion and an upper pyramidal portion, each of the pyramidal portions being in the shape of a right pyramid with a bottom in the figure of a regular quadrangle, is symmetric with respect to the horizontal center plane between the lower and upper pyramidal portions, and is provided on the top of the upper pyramidal portion with a lower anvil;

four slide blocks each of which has an inner pyramidal portion laid laterally inward and an outer pyramidal portion laid laterally outward, each of the inner and outer pyramidal portions being in the shape of a right pyramid with a bottom in the figure of a regular quadrangle, is symmetric with respect to the vertical center plane between the inner and outer pyramidal portions, and is provided on the pyramidal top of the inner pyramidal portion with a side anvil;

an upper base block which has a lower upside-down pyramidal portion and an upper pyramidal portion, each of the pyramidal portions being in the shape of a right pyramid with a bottom in the figure of a regular quadrangle, is symmetric with respect to its horizontal center plane, and is provided on the pyramidal top of the lower upside-down pyramidal portion with an upper anvil;

an upper guide block which has a pyramidal recess in its bottom surface defined by four uniform slopes sloping up toward the center of the block, the recess being in the shape of a right pyramid with a bottom in the figure of a regular quadrangle, and an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane; and an upper pyramidal block which has a base portion and a pyramidal portion formed on the base portion, the pyramidal portion being in the shape of a right pyramid with a bottom in the figure of a regular quadrangle, and is disposed downward, the above components being arranged from bottom to top in the order of their description between a ram and a frame of a press, the lower pyramidal block being set on the ram or the frame;

the lower guide block being set on the lower pyramidal block, the pyramidal portion of the lower pyramidal block being fitted into the lower pyramidal recess of the lower guide block, the lower base block being disposed at the center of the upper upside-down pyramidal recess of the lower guide block, the base of the upper downward pyramidal block being secured to the frame or the ram, as the case may be, the upper guide block being secured to the upper downward pyramidal block, the pyramidal portion of the upper downward pyramidal block being fitted into the upper upside-down pyramidal recess of the upper guide block, the upper base block being disposed at the center of the lower pyramidal recess of the upper guide block, the four slide blocks being disposed so as to slide along the pyramidal slopes of the upper pyramidal portion of the lower base block, the pyramidal slopes of the lower upside-down pyramidal portion of the upper base block, the pyramidal slopes of the upper upside-down pyramidal recess of the lower guide block, and the pyramidal slopes of the lower pyramidal recess of the upper guide block.

2. A very-high pressure generator comprising:

a lower pyramidal block which has a base portion and a pyramidal portion formed on the base portion, the pyramidal portion being in the shape of a right pyramid with a bottom in the figure of a regular quadrangle;

a lower guide block which has (i) a vertical through hole at its center, (ii) a pyramidal recess in its bottom surface defined by four uniform slopes sloping up toward the center of the block, the recess being in the shape of a right pyramid with a bottom in the figure of a regular quadrangle, and (iii) an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane;

a lower base block which includes an insert block to be inserted in the through hole of the lower guide block and a pyramidal press block set on the insert block, the pyramidal press block being in the shape of a right pyramid with a bottom in the figure of a regular quadrangle, and is provided on the top of the pyramidal press block with a lower anvil;

four slide blocks each of which includes an inner pyramidal press block laid laterally inward and an outer pyramidal block laid laterally outward, each of the inner and outer pyramidal blocks being in the shape of a right pyramid with a bottom in the figure of a regular quadrangle, and is provided on the pyramidal top of the inner pyramidal press block with a side anvil;

an upper base block which includes an insert block and a pyramidal press block set on the insert block, the pyramidal press block being in the shape of a right pyramid with a bottom in the figure of a regular quadrangle, is disposed downward, and is provided on the pyramidal top of the pyramidal press block with an upper anvil;

an upper guide block which has (i) a vertical through hole at its center which the insert block of the upper base block is inserted in, (ii) a pyramidal recess in its bottom surface defined by four uniform slopes sloping up toward the center of the block, the recess being in the shape of a right pyramid with a bottom in the figure of a regular quadrangle, and (iii) an upside-down pyramidal recess in its top surface defined by four uniform slopes sloping down toward the center of the block, the recess being in the shape of a right pyramid with a bottom in the figure of a regular quadrangle, and is symmetric with respect to its horizontal center plane; and an upper pyramidal block which has a base portion and a pyramidal portion formed on the base portion, the pyramidal portion being in the shape of a right pyramid with a bottom in the figure of a regular quadrangle, and is disposed downward, the above components being arranged from bottom to top in the order of their description between a ram and a frame of a press, the lower pyramidal block being set on the ram or the frame;

the lower guide block being set on the lower pyramidal block, the pyramidal portion of the lower pyramidal block being fitted into the lower pyramidal recess of the lower guide block, the insert block of the lower base block being inserted in the vertical through hole of the lower guide block, the base of the upper downward pyramidal block being secured to the frame or the ram, as the case may be, the upper guide block being secured to the upper downward pyramidal block, the pyramidal portion of the upper downward pyramidal block being fitted into the upper upside-down pyramidal recess of the upper guide block, the insert block of the upper downward base block being inserted in the vertical through hole of the upper guide block, the four slide blocks being disposed so as to slide along the pyramidal slopes of the pyramidal press block of the lower base block, the pyramidal slopes of the pyramidal press block of the upper downward base block, the pyramidal slopes of the upper upside-down pyramidal recess of the lower guide block, and the pyramidal slopes of the lower pyramidal recess of the upper guide block.

3. A very-high pressure generator as claimed in claim 2, wherein the insert block of each of the lower and upper base blocks has at least a series of holes which are made from its bottom toward its top along its center axis, uniformly in cross section and depth, at the same radial distance from, and at equal angular intervals around, its center axis.

4. A very-high pressure generator as claimed in claim 3, wherein each of the press blocks of the lower and upper base blocks comprises an anvil to pressurize a pressure-transmitting medium, a base to support the anvil, and a shim set between the anvil and the base.

5. A very-high pressure generator wherein:

a guide block is disposed below, and another guide block is disposed above, a pressurizing space;

each of the two guide blocks comprises (i) a disk block which is round as seen from above, (ii) four stoppers formed on each of the bottom and top surfaces of the disk block, at the same radial distance from and at equal angular intervals around the center of the disk block, each stopper having an inner side, and (iii) four sliders on each of the bottom and top surfaces of the disk block, each slider having a back surface and a slope sloping down to its front end; and when the back surface of each slider is put into contact with the inner side of an stopper on each of the bottom and top surfaces of each disk block, the four slopes of the four sliders form a pyramidal recess in the shape of a right pyramid with a bottom in the figure of a regular quadrangle.

6. A very-high pressure generator as claimed in claim 5, wherein:

the disk block of the guide block below the pressuring space has a vertical through hole at its center, an insert block is inserted in the through hole, and an anvil is set on the top of the insert block; and the disk block of the guide block above the pressuring space has a vertical through hole at its center, an insert block is inserted downward in the through hole, and an anvil is set on the top of the downward insert block.

7. A very-high pressure generator as claimed in claim 5, wherein:

the bottom and top surfaces of each disk block are flat and parallel to each other;

the inner side of each stopper on each of the bottom and top surfaces of each disk block is flat and, as seen from above, at right angles with a radial straight line from the center of said disk block to the center of the inner side;

each slider on each of the bottom and top surfaces of each disk block has a flat contact surface to come into contact with the bottom or top surface, as the case may be, of said disk block; and the line where the contact surface and the back surface of each slider on each of the bottom and top surfaces of each disk block meet is parallel to the slope of said slider.

8. A very-high pressure generator as claimed in claim 7, wherein:

each stopper on each of the bottom and top surfaces of each disk block has a top surface which is flat and parallel to the bottom or top surface, as the case may be, of said disk block;

a raised support portion is formed on and behind the back surface of each slider on each of the bottom and top surfaces of each disk block;

the raised support portion of each slider on each of the bottom and top surfaces of each disk block has a support surface at its bottom which is flat and parallel to the bottom or top surface, as the case may be, of said disk body; and when each slider is set on a stopper on each of the bottom and top surfaces of each disk block, the support surface of the raised support portion of said slider comes in face-to-face contact with the top surface of the stopper.

9. A very-high pressure generator as claimed in claim 5, wherein each slider is provided with a wedge mechanism for adjusting the radial position of said slider, the wedge mechanism being disposed between the back surface of said slider and the inner side of the corresponding stopper.

10. A very-high pressure generator as claimed in claim 9, wherein the wedge mechanism of each slider comprises two wedges combined with each other and the radial position of said slider is adjusted by deepening and shallowing the engagement between the two wedges.

\* \* \* \* \*